(12) United States Patent
Edwards

(10) Patent No.: US 6,196,646 B1
(45) Date of Patent: Mar. 6, 2001

(54) ENDLESS DRIVE TRACK SYSTEM WITH REINFORCING BRACE AND METHOD

(76) Inventor: John W. Edwards, 7269 Bee Ridge Rd., Sarasota, FL (US) 34241

( * ) Notice: Subject to any disclaimer, the term of this patent is extended or adjusted under 35 U.S.C. 154(b) by 0 days.

(21) Appl. No.: 09/271,150

(22) Filed: Mar. 17, 1999

(51) Int. Cl.[7] .............................. B62D 55/24; F16G 1/04
(52) U.S. Cl. ............................................ 305/167; 305/173
(58) Field of Search ................................. 305/165, 167 I, 305/169, 171, 177, 178, 179, 180, 195, 199, 160, 193, 194, 173

(56) References Cited

U.S. PATENT DOCUMENTS

| | | |
|---|---|---|
| Re. 33,324 | 9/1990 | Edwards et al. . |
| 3,575,474 * | 4/1971 | Russ, Sr. ............................... 305/165 |
| 3,721,477 * | 3/1973 | Cooper et al. ........................ 305/179 |
| 3,747,995 * | 7/1973 | Russ, Sr. ............................... 305/179 |
| 3,900,231 * | 8/1975 | Ohm ...................................... 305/167 |
| 4,218,932 * | 8/1980 | McComber ........................... 305/169 |
| 4,844,560 | 7/1989 | Edwards et al. . |
| 5,005,921 | 4/1991 | Edwards et al. . |
| 5,020,865 | 6/1991 | Edwards et al. . |
| 5,040,282 | 8/1991 | Edwards et al. . |
| 5,447,365 * | 9/1995 | Muramatsu et al. .................. 305/167 |
| 5,984,438 * | 11/1999 | Tsunoda et al. ...................... 305/179 |
| 6,000,766 * | 12/1999 | Takeuchi et al. ..................... 305/165 |

OTHER PUBLICATIONS

Posi–Track HD Manual, ASV, Inc. (Brochure) (This brochure was published prior to the filing date of the instant application, and it is Applicant's present understanding that the subject matter was in the public domain more than one year prior to the filing date of the instant application).

* cited by examiner

Primary Examiner—S. Joseph Morano
Assistant Examiner—Jason R. Bellinger
(74) Attorney, Agent, or Firm—Oliff & Berridge, PLC

(57) ABSTRACT

An endless drive track system for use with a tracked vehicle. The endless drive track system includes a planetary drive system having drive rollers, a plurality of roller wheels, and an endless track with a reinforcing brace embedded within the endless track for at least one of a plurality of drive beads extending from an interior surface of the endless track. The reinforcement brace is made of wear-resistant material. Each drive bead has at least one drive face that is engaged by the drive rollers of the planetary drive system. The roller wheels frictionally engage at least one, if not both, friction faces of each drive bead. Each reinforcing brace includes a horizontal section having first and second ends. A first flange extends from the horizontal section near a first friction face of each drive bead while a second flange extends from the horizontal section near a second drive friction face of each drive bead. The first and second flanges extend from a horizontal section of the reinforcing brace. The reinforcing brace decreases the amount each drive beads erodes from the frictional engagement of the roller wheels.

37 Claims, 19 Drawing Sheets

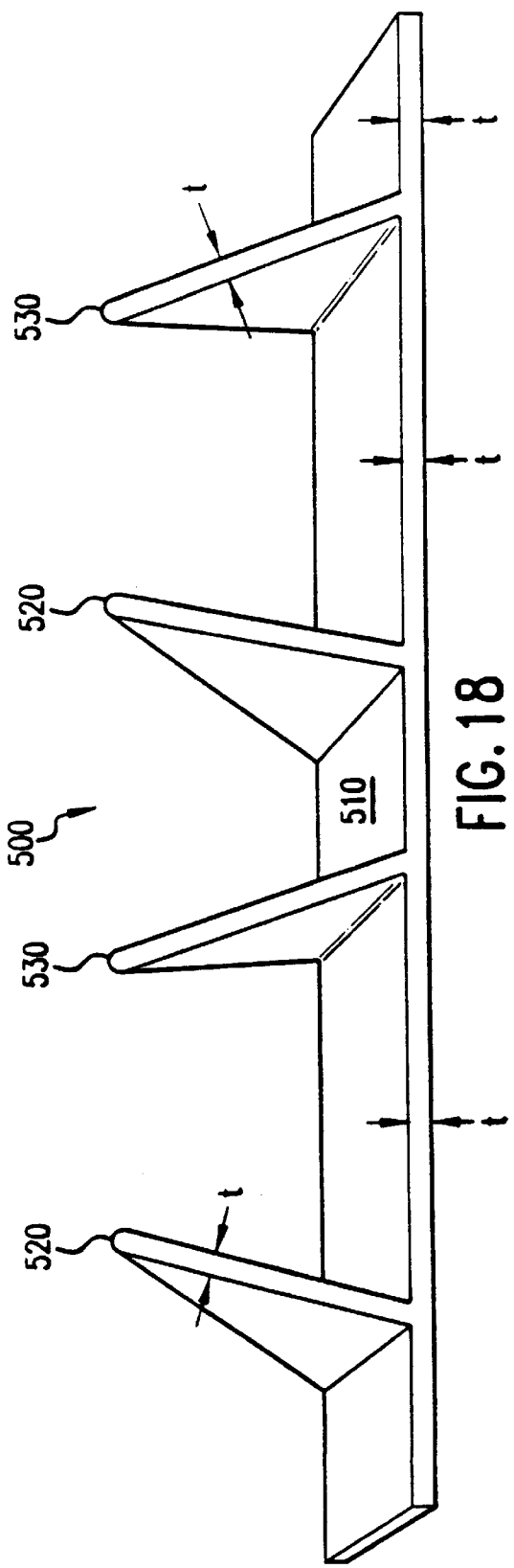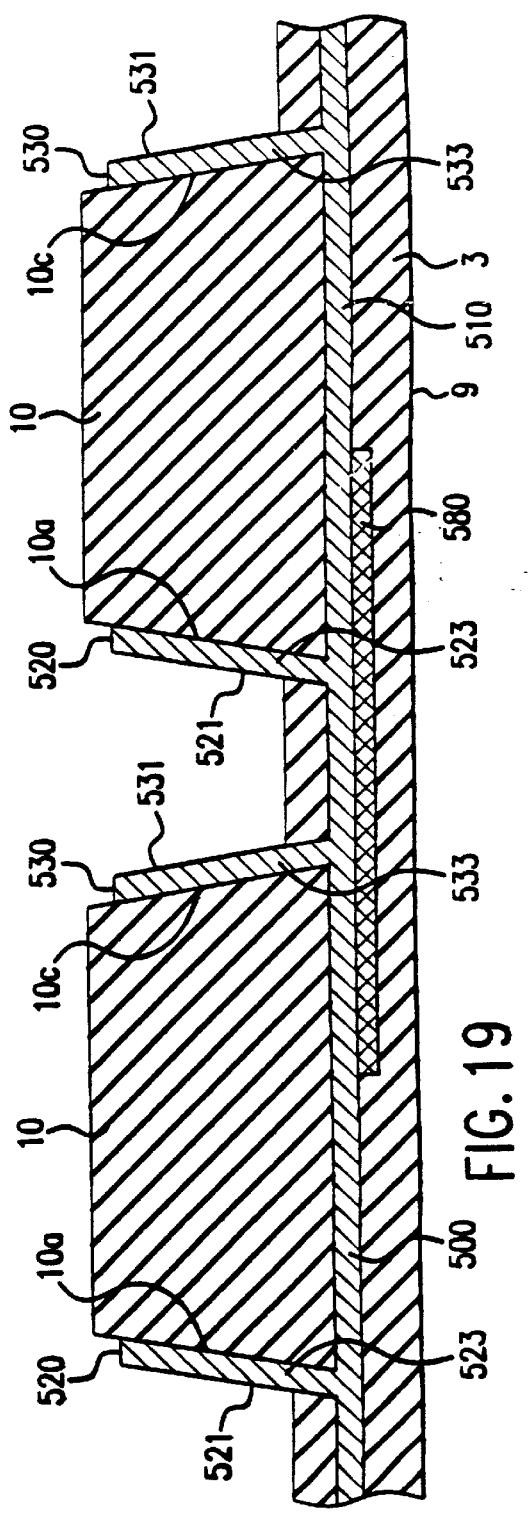

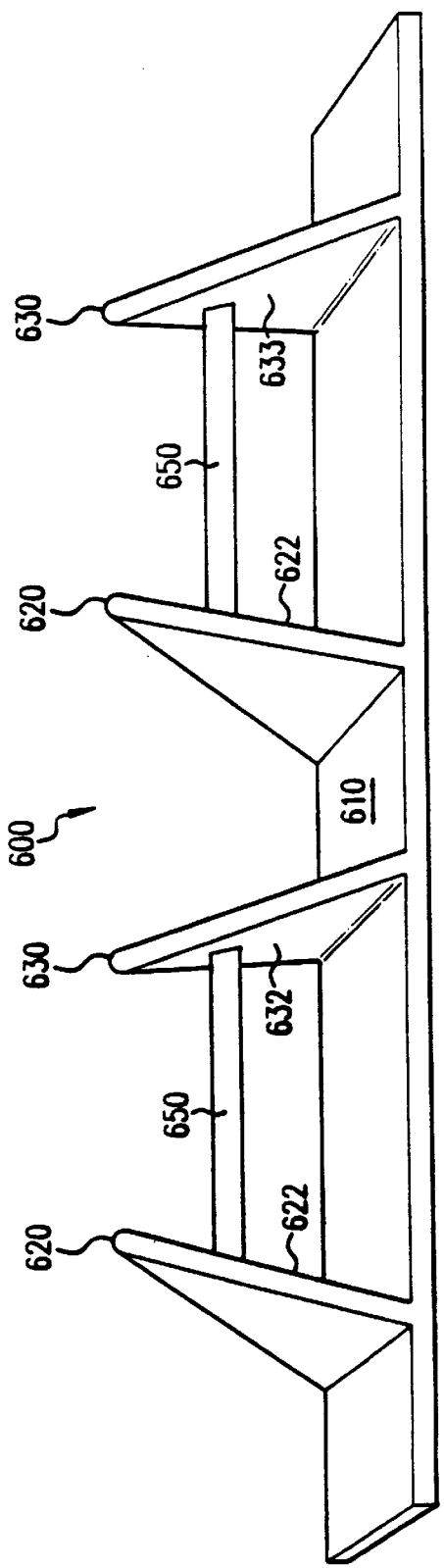
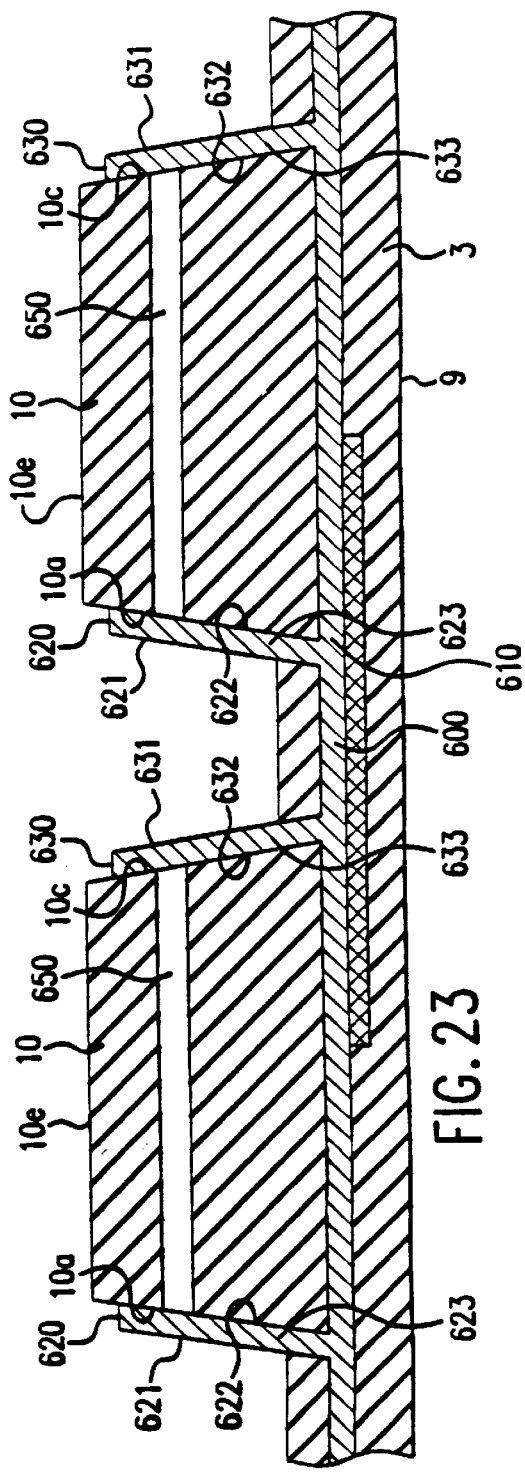
FIG. 22
FIG. 23

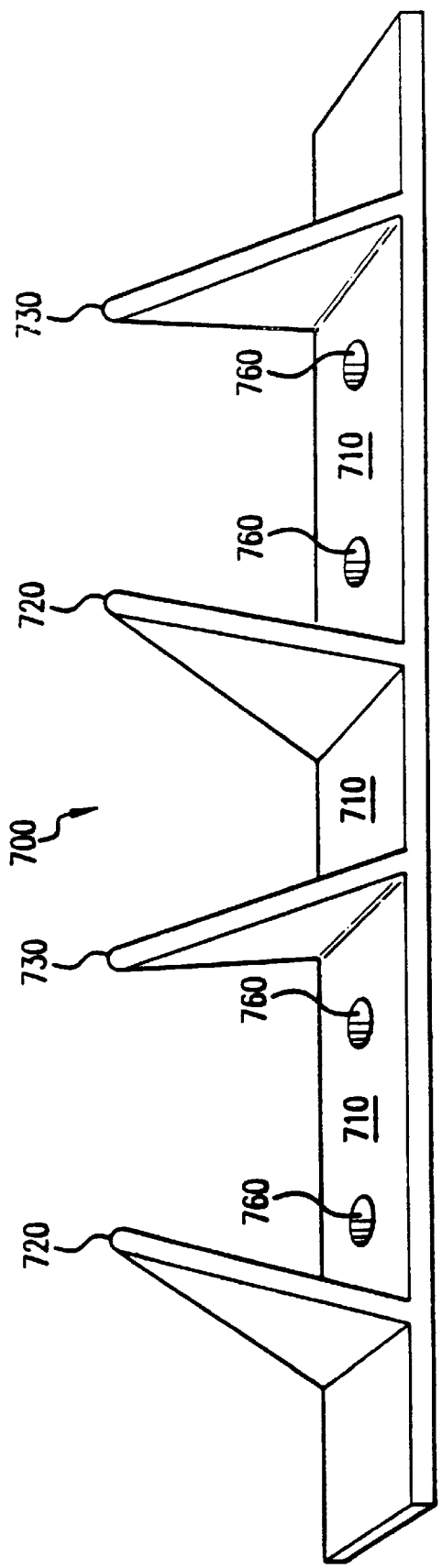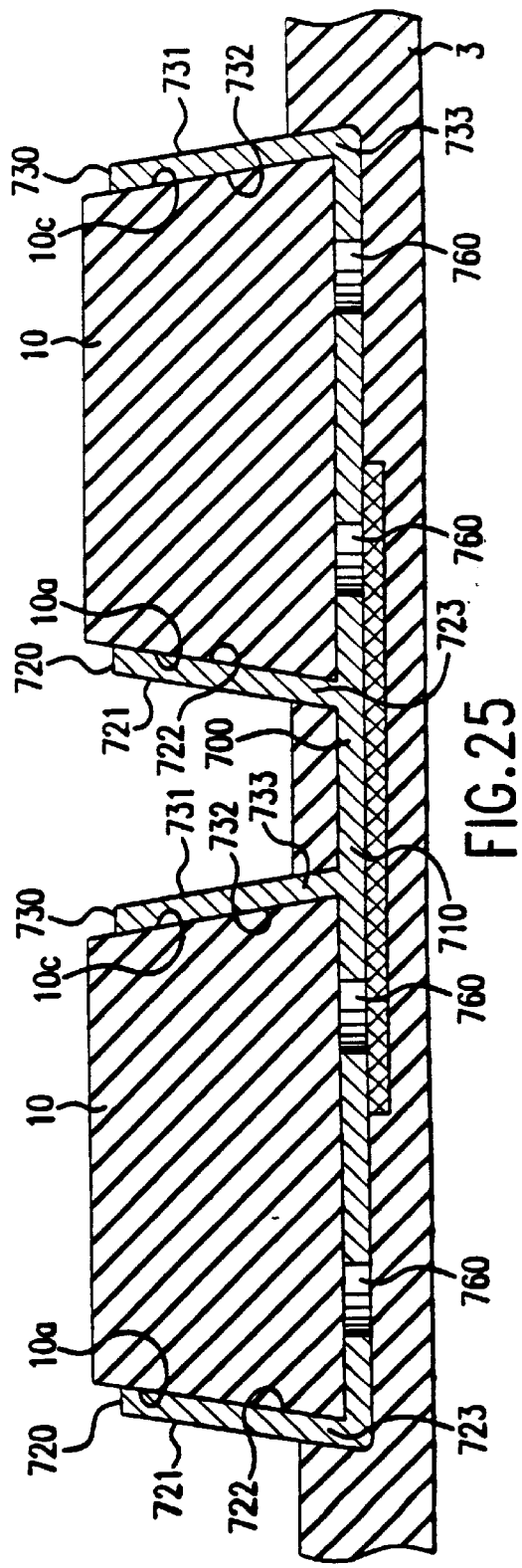
FIG. 24
FIG. 25

ENDLESS DRIVE TRACK SYSTEM WITH REINFORCING BRACE AND METHOD

BACKGROUND OF THE INVENTION

1. Field of Invention

The present invention relates to a track for an endless drive track system. More particularly, the present invention relates to an endless drive track system having reinforcing braces for use with a tracked vehicle such as a tractor, bulldozer or tank.

2. Description of Related Art

Conventional endless drive track systems are used with tracked vehicles such as tractors, bulldozers, tanks or the like, as shown in U.S. Pat. No. Re. 33,324, incorporated herein by reference. As shown in FIG. 1 herein, a vehicle 1 includes an endless drive track system 2 with an endless track 3, a drive system, e.g., a planetary drive system 4, and a plurality of roller wheels 5, also commonly known as idler wheels. The planetary drive system 4 and plurality of roller wheels 5 are located at separate positions within the endless drive track system 2. For example, when drive rollers 6 of the planetary drive system 4 rotate in a clockwise direction, the endless track 3 is driven in the clockwise direction. The roller wheels 5 also rotate in the clockwise direction due to the frictional engagement of the roller wheels 5 with the driven endless track 3. Alternatively, the roller wheels 5 can be positively driven. Consequently, the drive rollers 6, roller wheels 5 and endless track 3 rotate in a common direction.

The endless track 3 is comprised of a plurality of drive sections 7. FIG. 2 shows an exploded perspective view of an exemplary drive section 7 where the drive rollers 6 of the planetary drive system 4 engage the drive section 7 of the endless track. Each drive section 7 includes an interior surface 8 and an exterior surface 9. The exterior surface 9 of each drive section 7 faces away relative to the endless drive track system 2 and includes a tread that contacts the ground over which the tracked vehicle 1 travels. The interior surface 8 of each drive section 7 faces toward the endless drive track system 2 and includes a plurality of drive beads 10 extending inwardly from the interior surface 8.

Typically, a drive bead 10 includes four faces 10a–d. Faces 10b and 10d are drive faces that extend in a longitudinal direction of the endless track 3 and are contacted and driven by the drive rollers 6. An arrow A indicates the endless track 3 being driven from right to left, although the endless track 3 is also capable of being driven from left to right. The remaining faces 10a and 10c are friction faces and extend in a direction orthogonal to the longitudinal direction of the endless track 3.

FIG. 3 shows a schematic diagram of the drive rollers 6 rotated in a clockwise direction by the planetary drive system 4 to engage and drive the drive beads 10. When a drive section 7 of the endless track 3 reaches the planetary drive system 4, the rotated drive rollers 6 of the planetary drive system 4 contact drive face 10b of the drive beads 10 to drive the endless track 3 in the clockwise direction. Similarly, when the drive rollers 6 are rotated in the counterclockwise direction, the drive rollers 6 contacts drive face 10d of the drive beads 10 to drive the endless track 3 in a counterclockwise direction. As such, upon contacting the drive face 10b or 10d of the drive beads 10, the drive rollers 6 are able to drive the drive section 7 of the endless track 3 in a desired direction. The drive rollers 6 repeat the above-described operation for every drive bead 10 passing through the planetary drive system 4.

Unfortunately, as the drive rollers 6 of the planetary drive system 4 are typically constructed from wear-resistant materials and the endless track 3 is typically made of a polymeric material, the engagement of the drive rollers 6 with the drive beads 10 of the endless track 3 may result in the wearing down or erosion of the drive beads 6. Although, the drive rollers 6 are illustrated as substantially filling the region between adjacent drive beads 10, the size of the drive rollers 6 can be made smaller, as long as the drive rollers 6 are capable of engaging the drive faces 10b and 10d of the drive beads 10.

FIG. 4 shows an exploded perspective view of where the roller wheels 5 engage a drive 7 section of the endless track 3 driven in the clockwise, i.e., right to left, direction. In the illustration, three roller wheels 5 are provided on a common shaft, although more or less than three rollers can be provided, and independent shafts may be desirable, depending on need. As such, because of the frictional engagement of the endless track 3 with the roller wheels 5, each roller wheel 5 is rotated in the clockwise direction with the drive section 7 of the endless track 3. The rotation of the roller wheels 5 provides even support across the endless track 3 in an orthogonal direction relative to the direction the track 3 is driven.

FIG. 5 is cross-sectional view of the roller wheels 5 engaging the drive section 7 of the endless track 3 shown in FIG. 4, as taken along section line 5—5. The spacing of the roller wheels 5 relative to the drive beads 10 is such that the wheels 5 should not contact the friction faces 10a and 10c of the drive beads 10 while engaging the drive section 7.

Unfortunately, as represented by the bidirectional arrows in FIG. 5, the endless track 3 has a tendency to move with respect to the roller wheels 5 in the direction parallel to the axes of the roller wheels 5. Consequently, the roller wheels 5 frictionally engage the friction faces 10a and 10c of the drive beads 10. As the roller wheels 5 are typically constructed from wear-resistant materials and the endless track 3 is typically made of a polymeric material, the frictional engagement of the roller wheels 5 with the drive beads 10 results in the wearing down or eroding of the friction faces 10a and 10c of the drive bead 10.

For example, as shown in FIG. 6, which is an enlargement of the dashed box of FIG. 5, the frictional force of the roller wheels 5 on the friction faces 10a and 10c of the drive bead 10 results in the wearing away of the drive friction faces 10a and 10c. The worn away portions of the drive bead 10 are represented by the shaded region. The gradual decrease in the surface area weakens the drive beads 10 and causes early failure of the drive belt. For example, the endless drive belt may need to be replaced after 300 working hours due to erosion of the drive beads. Also, due to the reduced surface area, "slipping" can occur between the drive rollers 6 of the planetary drive system 4 and the endless track 3.

Furthermore, the wearing away of the friction faces 10a and 10c weakens the structural integrity of the endless track 3 and permits an increase in lateral "play", i.e., the extent the endless track 3 moves in the direction parallel to the axes of the roller wheels 5. Also, the wearing away of the endless track 3 frequently requires that the endless track 3 be replaced, which requires a stoppage of work, increases the cost associated with using the tracked vehicle 1, and increases labor costs.

SUMMARY OF THE INVENTION

It is an aspect of the invention to provide an endless track having reinforcing braces made from wear-resistant material that are capable of preventing roller wheels from wearing away the friction faces of drive beads extending from the endless track.

It is another aspect of the invention to provide an endless track having reinforcing braces made from wear-resistant material that are capable of preventing the drive rollers of the planetary drive system from slipping when attempting to engage the drive beads.

It is also another aspect of the invention to provide an endless track having reinforcing braces made from wear-resistant material that decreases the frequency at which the endless track must be replaced because the track is worn away, the number of work stoppages to replace the track, as well as labor costs.

In order to achieve the above, and to overcome the shortcomings in the related art, an endless drive track system according to a preferred embodiment of the invention includes a drive system, a plurality of roller wheels, and an endless track with reinforcing braces embedded in the endless track and/or drive beads. Each reinforcing brace is made of wear-resistant material. The drive beads extend in a direction inwardly from an interior surface of the endless track and have first and second friction faces that may contact the roller wheels and a pair of drive faces that are engaged by the drive rollers to drive the endless track in a driven direction.

The reinforcing brace may include a connecting section (embedded in the endless track) having a first end and a second end. Additionally, the reinforcing brace also includes a first flange extending from the connecting section near the first friction face of each drive bead and a second flange extending from the connecting section near the second friction face of each drive bead. The first and second flanges each extend from the interior surface of the endless track and have a width that extends along the longitudinal direction of the endless track.

In a second embodiment of the invention, the reinforcing braces can also include a support rod attached to an interior face of the first flange and an interior face of the second flange with the support rod maintaining a distance between the first and second flanges. If a connecting section is provided, the support rod extends substantially parallel to the connecting section.

In a third embodiment of the invention, the connecting section of the reinforcing brace, if one is provided, can also include at least one aperture that is configured to interact with a portion of the endless track and promote positive locking of the reinforcing brace within the endless track. The aperture can also receive a bolt or other suitable fastening devices for attachment to the endless track and/or removable tread element.

In a fourth embodiment of the invention, the reinforcing brace can include both a support rod attached to the interior faces of the first and second flanges and at least one aperture in the connecting section.

The connecting section may include a rib that extends away from the connecting section in a direction opposite to the first and second flanges. The rib is located on a bottom face of the connecting section at a position spanning a region that is at least between adjacent drive beads. The rib extending from the bottom face provides the reinforcing brace with additional strength to guard against the brace from cracking when the endless track drives over an obstruction, such as a rock.

Additionally, a section of the exterior surface of the endless track may be provided with a relief or cutout between adjacent treads having the drive beads extending from the interior surface. The cutout section of the exterior surface of the endless track reduces the manufacturing and material costs of the endless track and provides the endless track with additional space to channel any fluids through treads in the track to provide better traction.

Furthermore, a cap may be placed on top of the extending flanges to protect a top portion of the drive bead in embodiments in which neither a connecting section nor a support rod would necessarily be provided.

These and other aspects will be described in or apparent from the following detailed description of preferred embodiments.

BRIEF DESCRIPTION OF THE DRAWINGS

Preferred embodiments of the invention will be described in conjunction with the following drawings in which like reference numerals designate like elements and wherein:

FIG. 18 is a perspective view of a unitary reinforcing brace capable of simultaneously protecting at least two drive beads, according to a sixth embodiment of the invention;

FIG. 19 is a cross-sectional view of the unitary reinforcing brace of FIG. 18 embedded in an endless track to simultaneously protect at least two drive beads;

FIG. 22 is a perspective view of a unitary reinforcing brace for protecting at least two drive beads of the endless track, according to a seventh embodiment of the invention;

FIG. 23 is a cross-sectional view of the unitary reinforcing brace of FIG. 22 embedded in an endless track to protect at least two drive beads;

FIG. 24 is a perspective view of a unitary reinforcing brace for protecting at least two drive beads of the endless track, according to an eighth embodiment of the invention;

FIG. 25 is a cross-sectional view of the unitary reinforcing brace of FIG. 24 embedded in an endless track to protect the at least two drive beads;

DETAILED DESCRIPTION OF PREFERRED EMBODIMENTS

Figure 1:
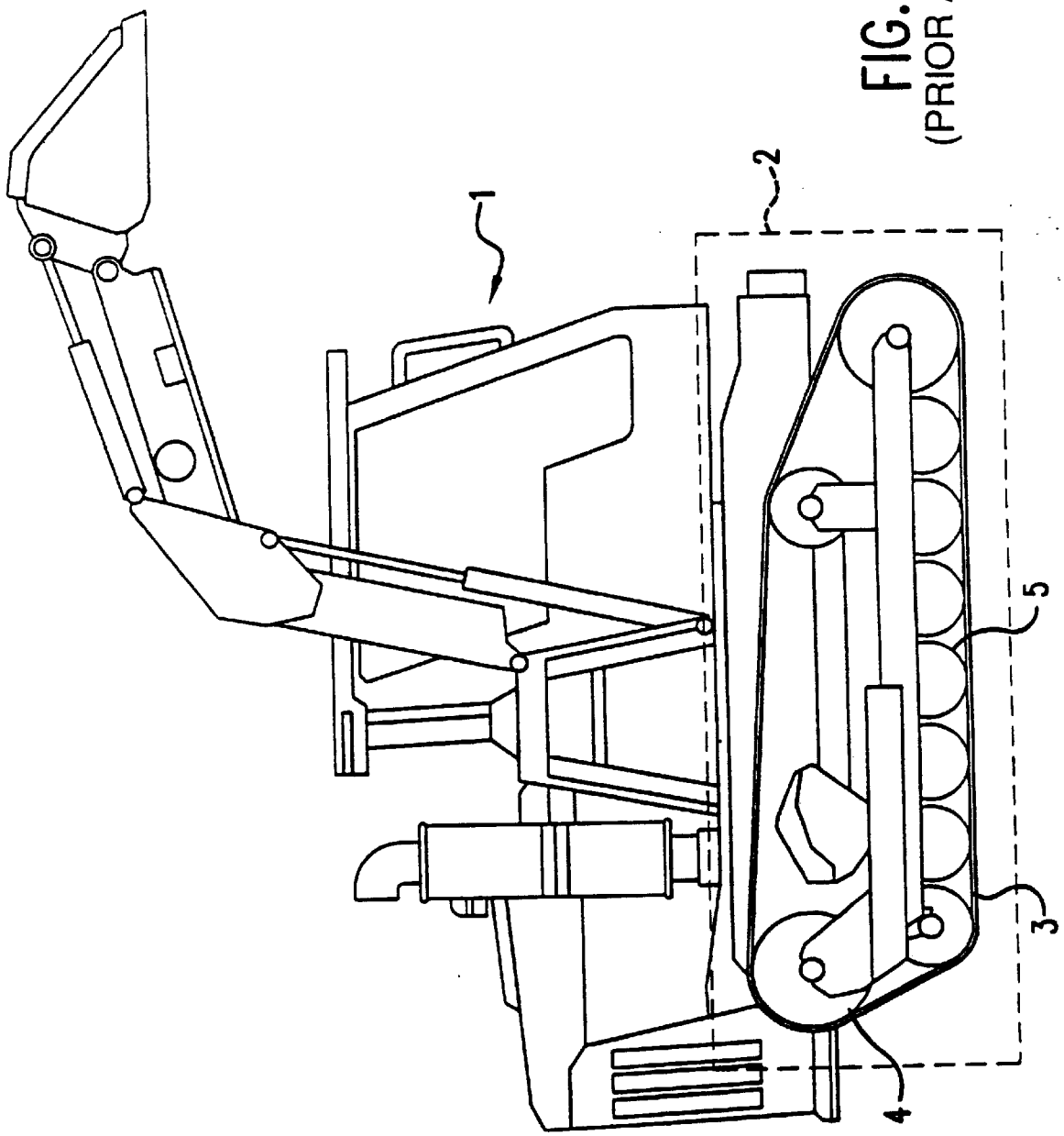
FIG. 1 is a perspective view of a tracked vehicle having a conventional endless drive track system.
Figure 2:
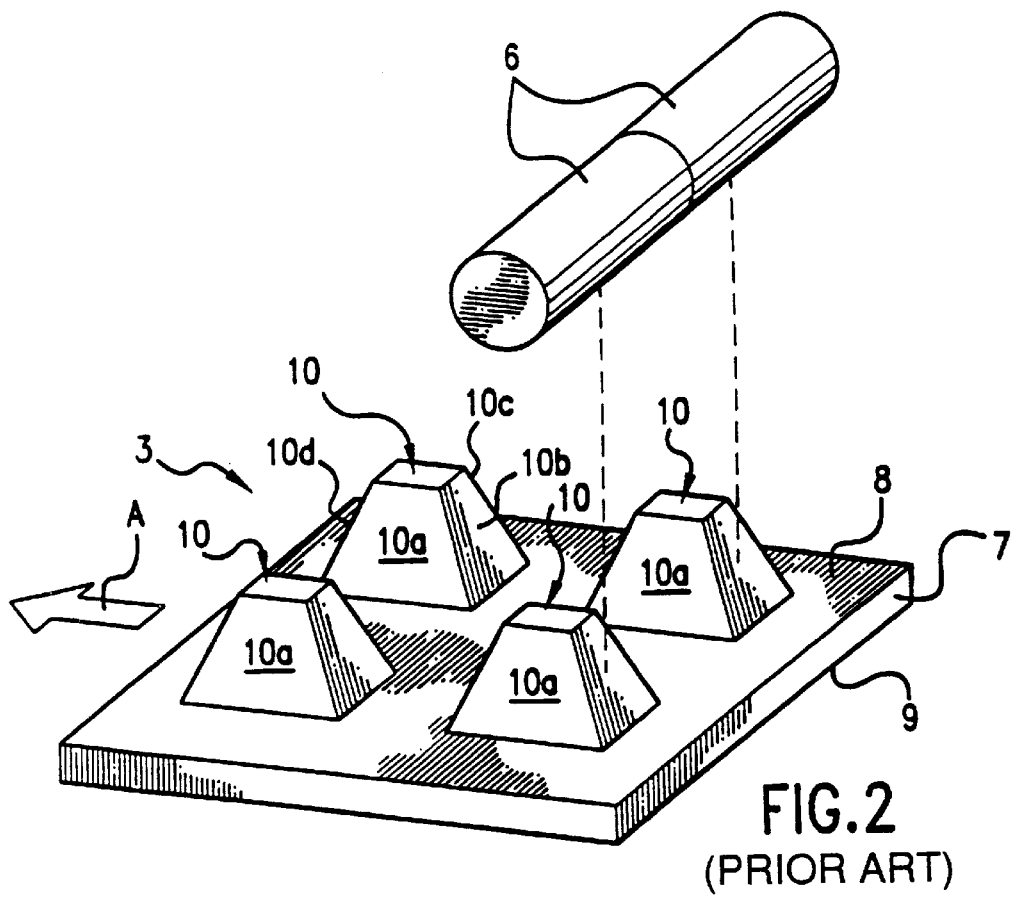
FIG. 2 is an exploded perspective view of an exemplary drive section where drive rollers of the planetary drive system engage a drive section of the endless track.
Figure 3:
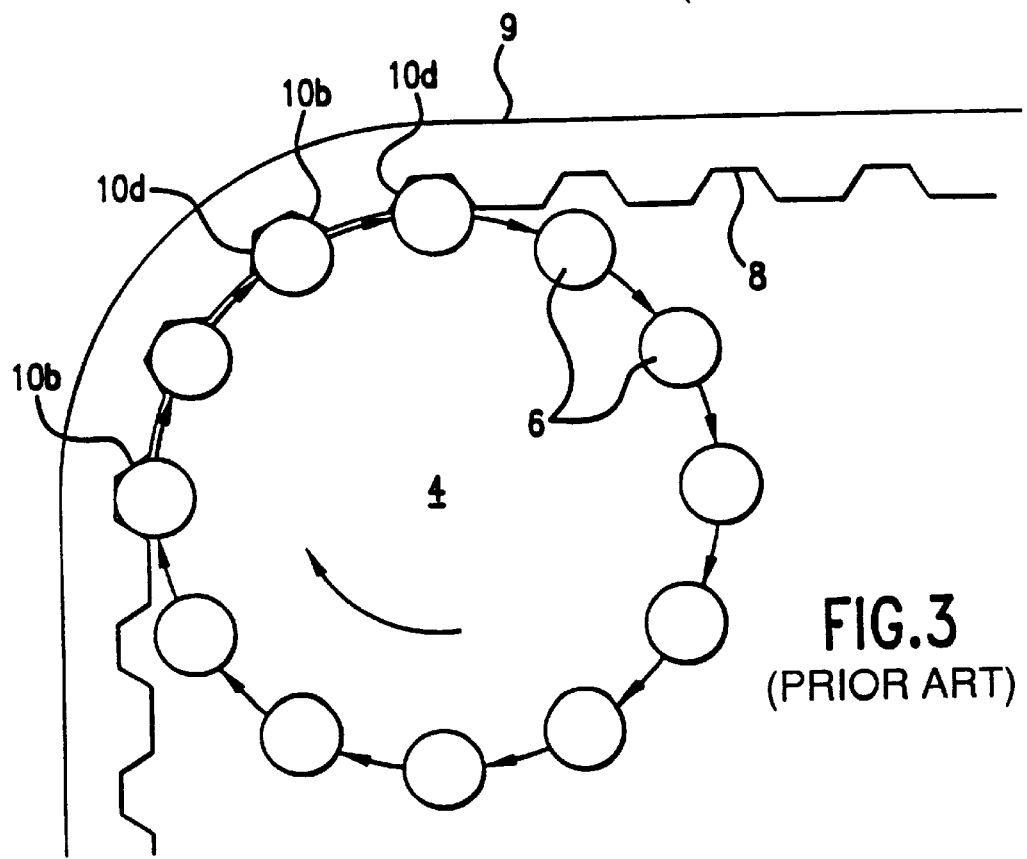
FIG. 3 is a schematic diagram of the drive rollers engaging drive faces of the drive beads of the conventional drive track system.
Figure 4:
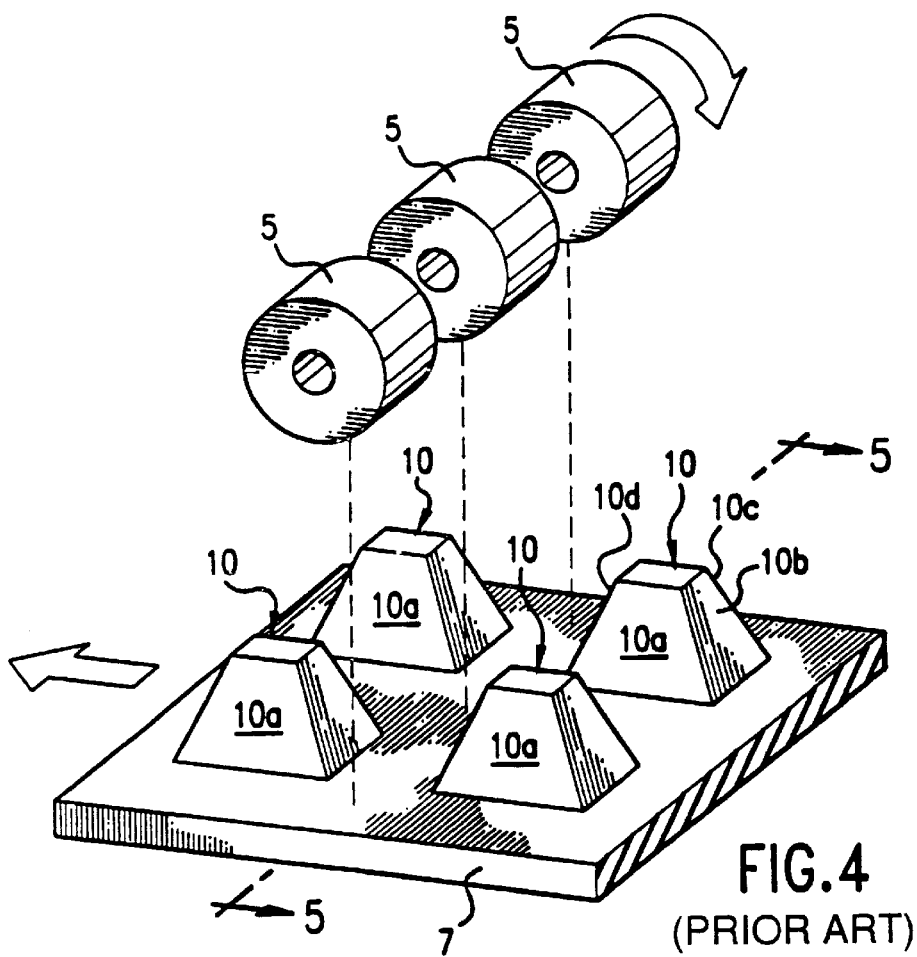
FIG. 4 is an exploded perspective view where the roller wheels of the conventional endless drive track system engaging a drive section of the endless track.
Figure 5:
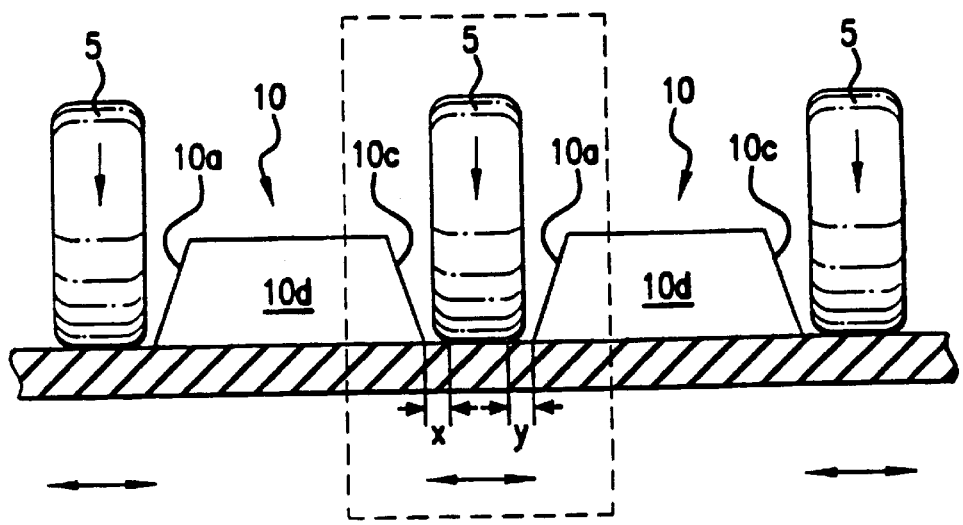
FIG. 5 is a cross-sectional view of the roller wheels engaging a drive section of the endless track, as taken along section line 5—5 of FIG. 4.
Figure 6:
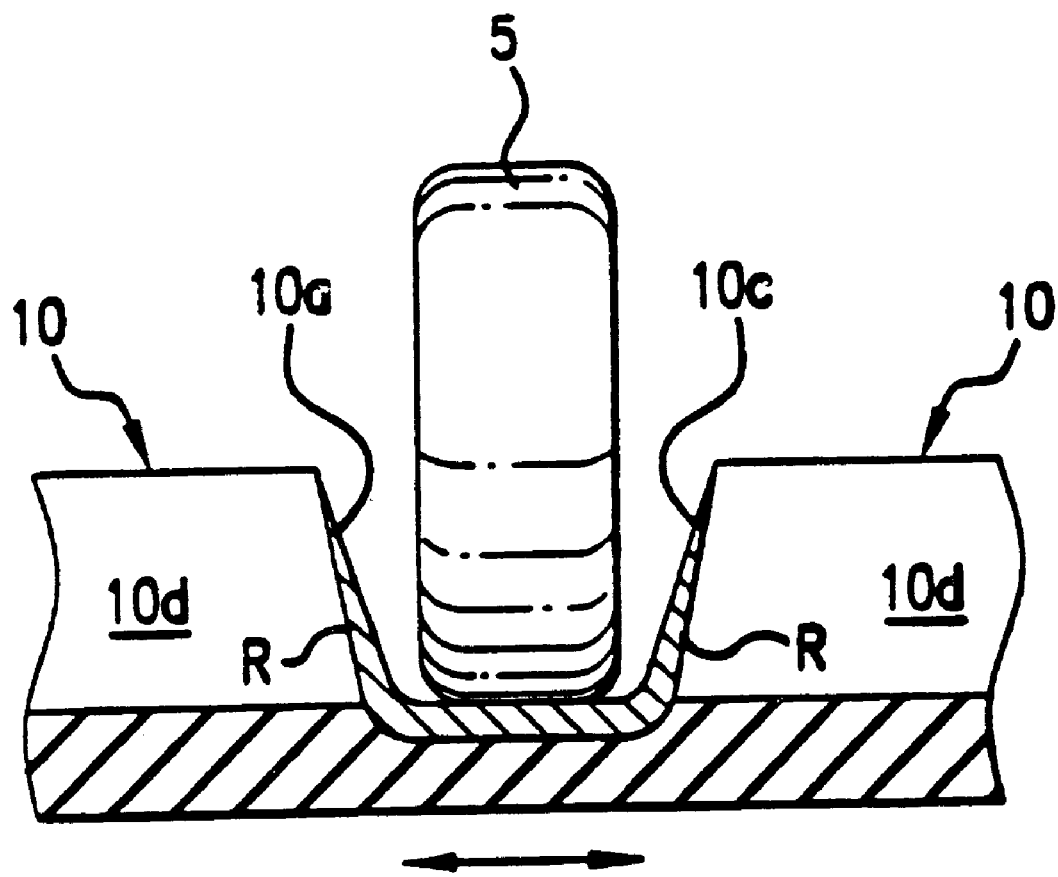
FIG. 6 is an enlarged view of the dashed box of FIG. 5 to illustrate the worn away portions of the drive friction faces of the drive beads due to the frictional force of the roller wheels.
Figure 7:
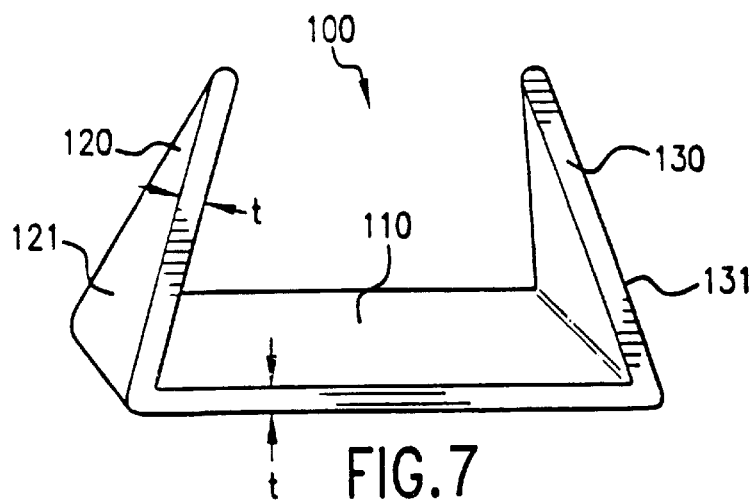
FIG. 7 is a perspective view of a reinforcing brace for protecting a drive bead of the endless track, according to a first embodiment of the invention.

FIG. 7 is a perspective view of a reinforcing brace 100 for protecting a drive bead 10 of an endless track 3, according to a first embodiment of the invention. Preferably, the reinforcing brace 100 is to be made from a wear-resistant material, such as, for example, metal and/or plastic materials. However, any material that can resist degradation or erosion due to the engagement of the drive rollers 6 from the planetary drive system 4 and/or the frictional contact of the roller wheels 5 would be suitable.

The reinforcing brace 100 may have a uniform thickness t, e.g., about 1/8" to about 1/2", and may include a connecting section 110 having two ends. The ends of the connecting section 110 can be bent to form extending flanges 120 and 130. For example, the brace 100 can initially be flat and then bent to form the flanges 120 and 130. Alternatively, the flanges can be attached, for example, by welding to a separate connecting section. The connecting section 110 may have a length of about 3"–5", which is preferably slightly longer than a length of the drive bead 10. Each flange 120 and 130 extends transversely away from the connecting section 110.

Figure 8:
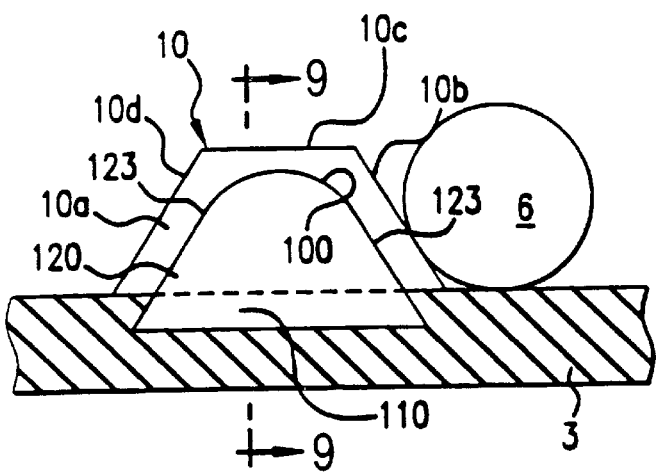
FIG. 8 is a side elevational view of the reinforcing brace embedded in the endless track.

As shown in FIG. 8, the width of the flanges 120 and 130 is about 2"–3" at each base, and is substantially similar to, but slightly smaller than, the width of the friction faces 10a and 10c of the drive bead 10 such that the drive roller 6 contacts the drive face 10b of the drive bead 10. The contour of an exterior face 121 and 131 of each extending flange 120 and 130 is also substantially similar to, but slightly smaller than, the contour of the drive friction faces 10a and 10c of the drive bead 10. Also, each flange 120 and 130 of the reinforcing brace 100 has a vertical height that is slightly smaller than the height of the drive beads 10.

Figure 9:
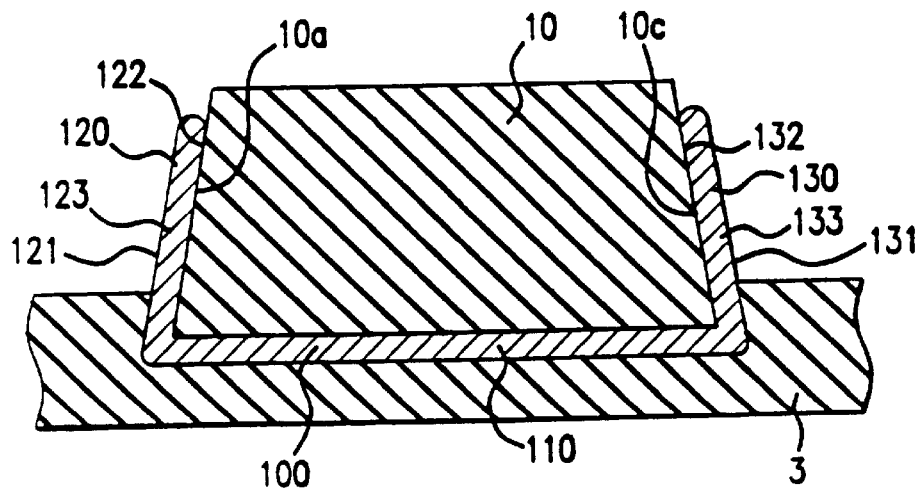
FIG. 9 is cross-sectional view of the reinforcing brace of FIG. 8 embedded in the endless track to protect a drive bead.

FIG. 9 is cross-sectional view of the reinforcing brace 100 of FIG. 8 embedded in an endless track 3 to protect a drive bead 10. The exterior faces 121 and 131 of the extending flanges 120 and 130 serve to protect the friction faces 10a and 10c of the drive bead 10 from the roller wheels 5 when the endless track 3 moves. As a result, the endless track 3 is not weakened, does not have to be replaced as often, nor are costs associated with corresponding work stoppages, such as labor, incurred. For example, the reinforcing brace 100 can extend the life of a drive belt to last up to 3000 hours or more because the drive beads are protected from damage.

Interior faces 122 and 132 of the flanges 120 and 130 of the reinforcing brace 100 are depicted as being flush with the friction faces 10a and 10c of the drive bead 10 for illustrative purposes. However, the flanges 120 and 130 can be formed to provide a predetermined gap (not shown) between the flanges 120 and 130 and the friction faces 10a and 10c.

Figure 9A:
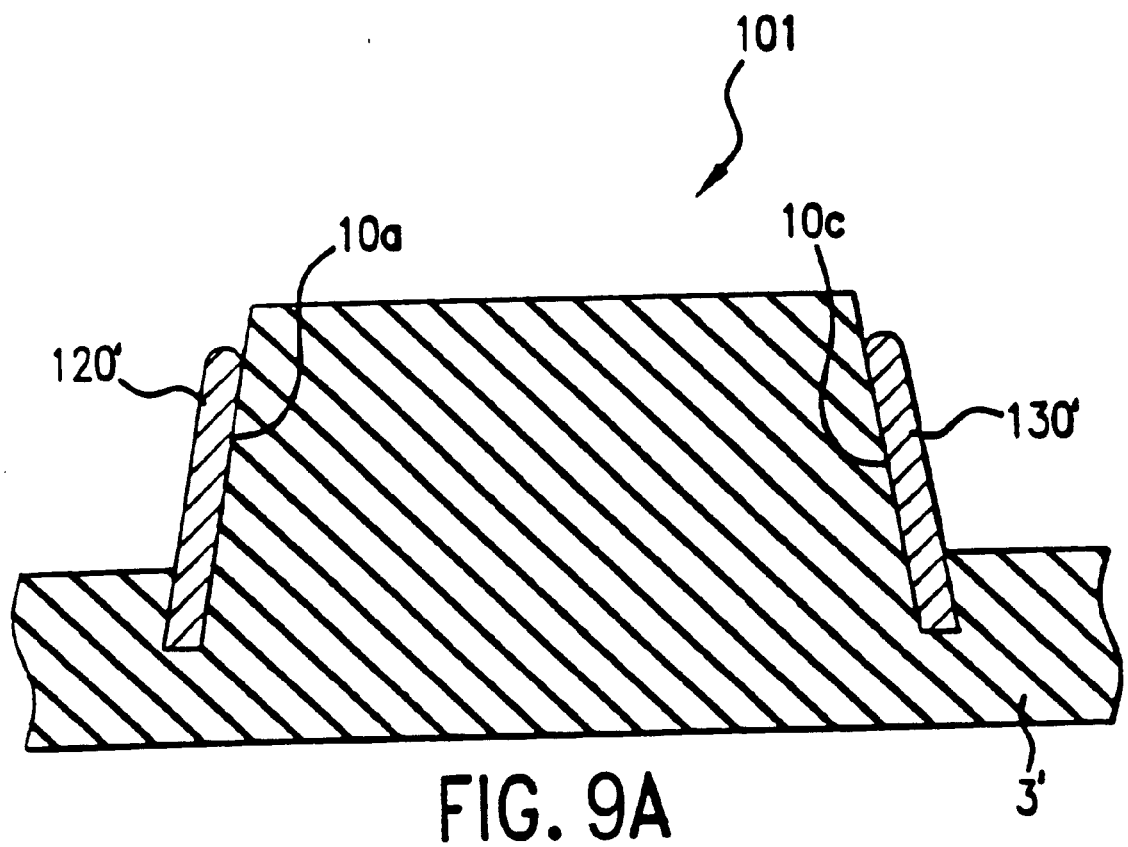
FIG. 9A is a cross-sectional view of an alternative embodiment of a reinforcing brace embedded in an endless track.

FIG. 9A shows another embodiment of the invention, which is similar to the reinforcing brace 100 shown in FIG. 9, but does not include a connecting section. In FIG. 9A, the friction faces 10a and 10c are protected and covered with flanges 120 and 130, which are simply embedded within the interior surface of the endless track 3.

Returning to FIG. 8, it can be seen that the drive rollers 6 frictionally engage the drive face 10b or 10d of each drive bead 10 depending on the rotation direction of the drive rollers 6. However, assuming wearing away of the drive faces 10b or 10d, edges 123 and 133 of the extending flanges 120 and 130 may come into contact with the drive rollers 6. Because the extending flanges 120 and 130 are made of wear-resistant material, the flanges 120 and 130 will not wear away or erode from contact with the drive rollers 6. Even if the drive faces 10b and 10d of the protected drive bead 10 do wear away or erode with the contact of the drive rollers 6, the drive rollers 6 of the planetary drive system 4 will drive the drive beads 10 of the endless track 3 by engaging the edges 123 and 133 of the extending flanges 120 and 130, thereby preventing the planetary drive system 4 from "slipping" while attempting to drive the endless track 3.

Figure 10:
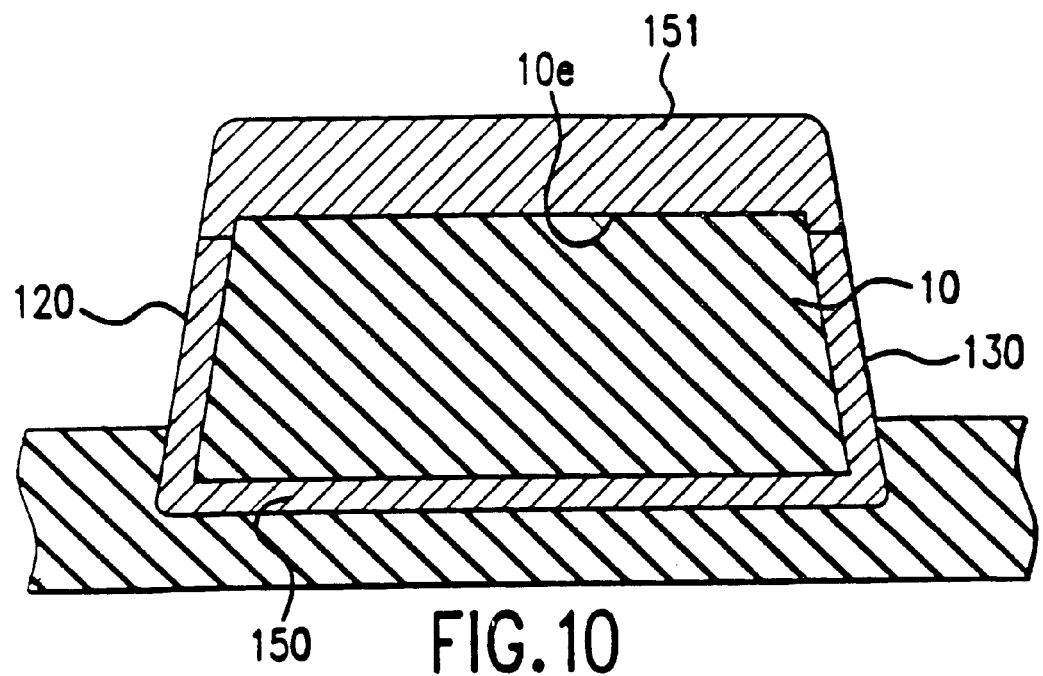
FIG. 10 is a cross-sectional view of a reinforcing brace embedded in an endless track to protect a drive bead, according to a second embodiment of the invention.

Also, assuming the drive faces 10b or 10d do wear away, a top portion 10e of the protected drive bead 10 may wear away from the frictional engagement with the drive rollers 6. As such, FIG. 10 is a cross-sectional view of a second embodiment of the reinforcing brace 150 for protecting a drive bead 10 of the endless track 3 from such an occurrence. The reinforcing brace 150 is substantially similar to the brace 100 depicted in FIGS. 7–9, but includes a cap 151.

Figure 11:
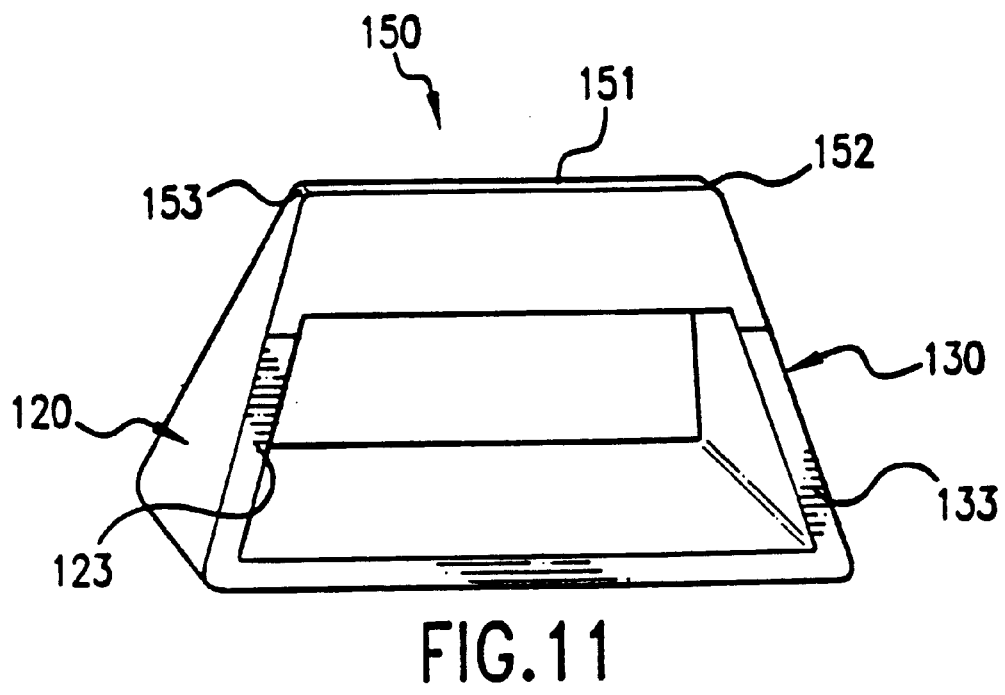
FIG. 11 is perspective view of the reinforcing brace of FIG. 10.

The cap 151 is made of a wear-resistant material, such as metal and/or plastic materials. However, any material that can resist degradation or erosion due to the engagement of the drive rollers 6 and/or the frictional contact from the rollers 5 would be suitable. The cap 151 is attached, for example, by welding to the top portion of each flange 120 and 130. As shown in FIG. 11, which is a perspective view of the reinforcing brace 150, the cap 151 extends from the flange 120 to the other flange 130 to prevent the drive rollers 6 from wearing away the top portion 10e of the drive bead 10. Thus, even if the drive faces 10b and 10d of the protected drive bead 10 do wear away or erode with contact of the drive rollers 6, the drive rollers 6 of the planetary drive system 4 will drive the drive beads 10 of the endless track 3 by engaging the edges 123 and 133 of the extending flanges 120 and 130 as well as the drive surfaces 152 or 153 of the cap 151, depending on the rotation direction of the drive rollers, thereby preventing the planetary drive system 4 from "slipping" while attempting to drive the endless track 3, as well as to prevent erosion of the top portion 10e of the drive bead 10, thereby extending the useful life of the bead 10.

Figure 12:
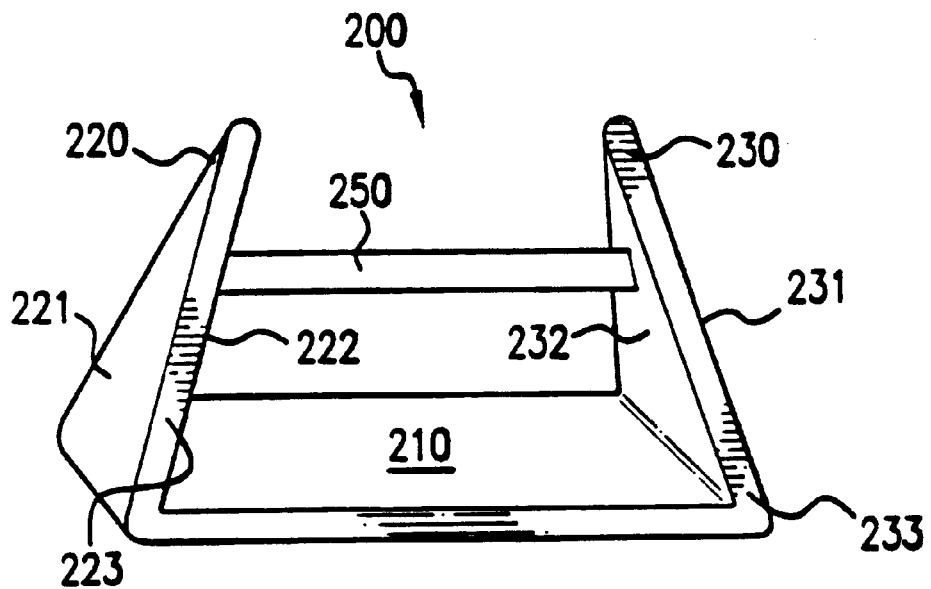
FIG. 12 is a perspective view of a reinforcing brace for protecting a drive bead of the endless track, according to a third embodiment of the invention.

FIG. 12 is a perspective view of a reinforcing brace 200 for protecting a drive bead 10 of the endless track 3, according to a third embodiment of the invention. The reinforcing brace 200 is substantially similar to the brace 100 depicted in FIGS. 7–11, but includes a support rod 250. Preferably, the support rod 250 is a uniform piece of a wear-resistant material having a first end and a second end. The first end of the support rod 250 is attached, for example only, by welding, to an interior face 222 of one extending flange 220 and the second end is attached to the interior face 232 of the other extending flange 230 in a similar manner.

Figure 13:
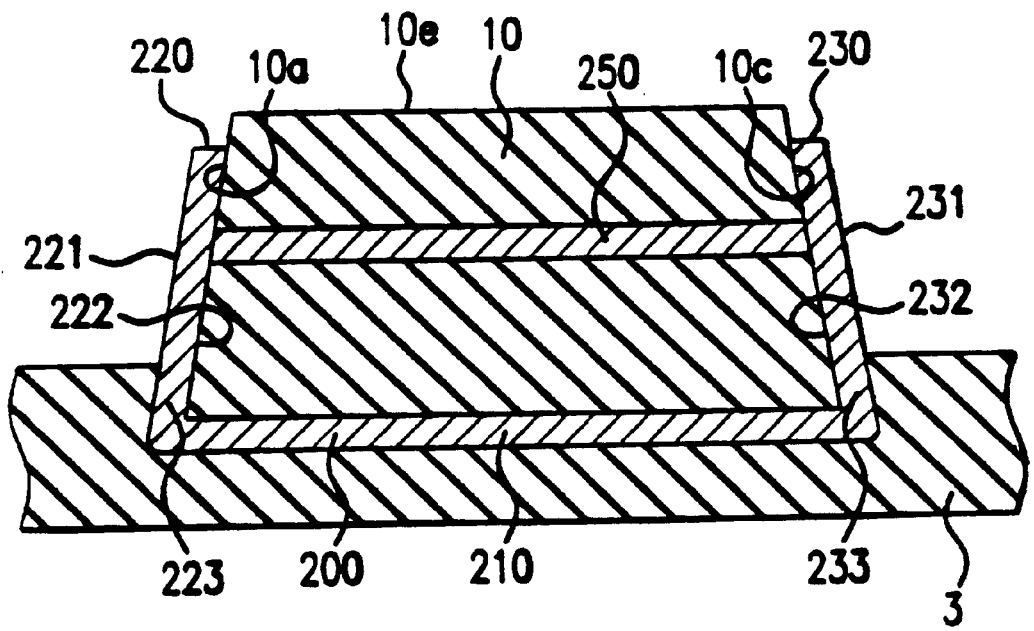
FIG. 13 is a cross-sectional view of the reinforcing brace of FIG. 12 embedded in the endless track to protect a drive bead.
Figure 13A:
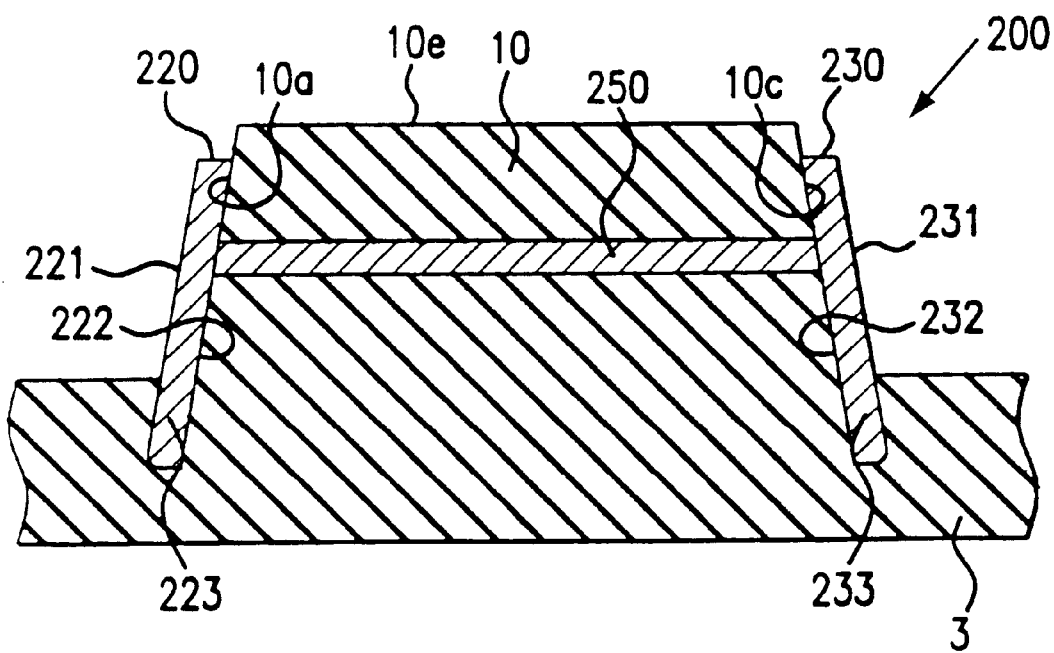
FIG. 13A is a cross-sectional view of an alternative embodiment of a reinforcing brace embedded in a drive bead of an endless track.

FIG. 13 is a cross-sectional view of the reinforcing brace 200 of FIG. 12 embedded in an endless track 3 to protect a drive bead 10. The exterior faces 221 and 231 of the extending flanges 220 and 230 serve to protect the friction faces 10a and 10c of the drive bead 10 from the roller wheels 5 when the endless track 3 moves in a direction parallel to the axes of the roller wheels 5. The support rod 250 maintains a distance between the flanges 220, 230. FIG. 13A shows another embodiment of the invention, which is similar to the reinforcing brace 200 shown in FIG. 13, but has only the support rod 250 as the connecting section. In FIG. 13A, the support rod 250 is embedded in the drive bead 10.

Furthermore, the drive rollers 6 frictionally engage the drive faces 10b or 10d of each drive bead 10, depending on the rotation direction of the drive rollers 6. However, assuming wearing away of one drive faces 10b and 10d, edges 223 and 233 of the extending flanges 220 and 230 may come into contact with the drive rollers 6 in a manner substantially similar to the reinforcing brace 100 of the first embodiment as discussed above. Also, if a top portion 10e of the protected drive bead 10 does wear away, the drive rollers 6 of the planetary drive system 4 will still be able to drive the drive beads 10 of the endless track 3 by engaging the support rod 250, in addition to the edges 223 and 233 of the extending flanges 220 and 230, thereby preventing the planetary drive system 4 from "slipping" while attempting to drive the endless track 3.

Figure 14:
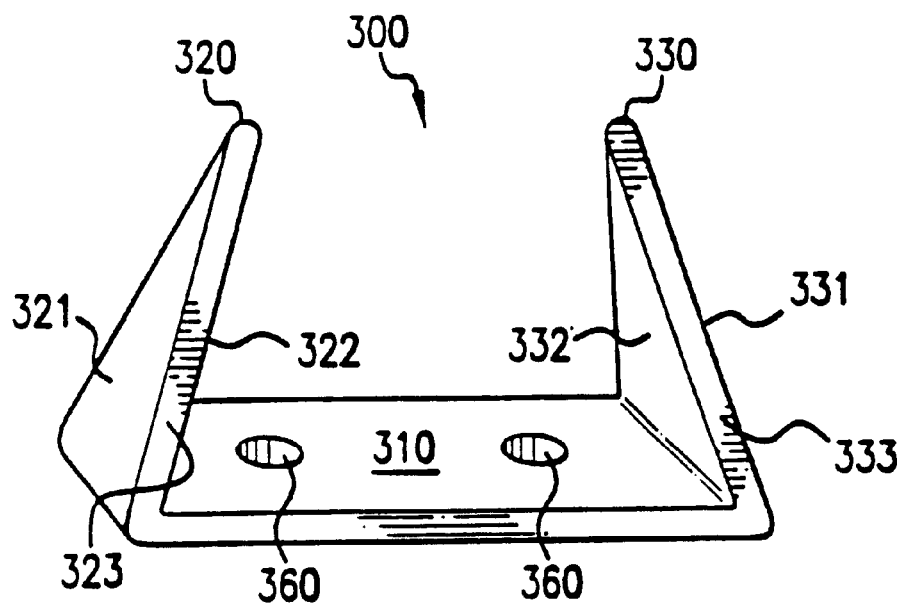
FIG. 14 is a perspective view of a reinforcing brace for protecting a drive bead of the endless track, according to a fourth embodiment of the invention.

FIG. 14 is a perspective view of a reinforcing brace 300 for protecting a drive bead 10 of the endless track 3, according to a fourth embodiment of the invention. The reinforcing brace 300 is substantially similar to the brace 100 depicted in FIGS. 7–11, but includes two apertures 360 in the connecting section 310. The apertures 360 are configured to interact with a portion of the endless track and promote locking of the reinforcing brace 300 within the endless track 3.

Figure 15:
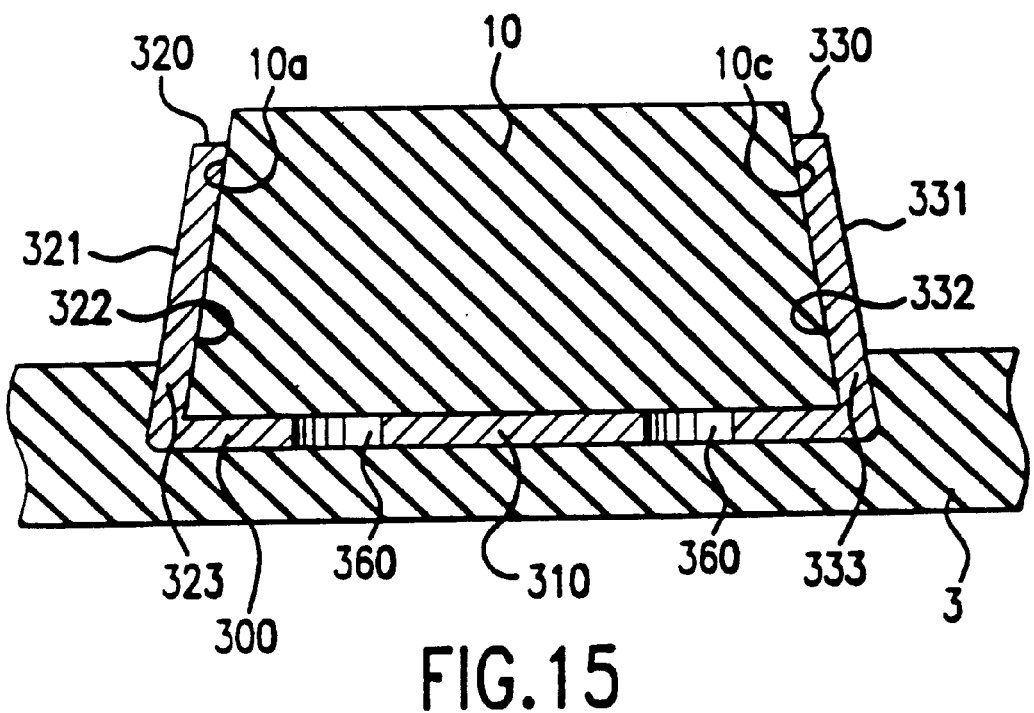
FIG. 15 is a cross-sectional view of the reinforcing brace of FIG. 14 embedded in the endless track to protect a drive bead.

FIG. 15 is a cross-sectional view of the reinforcing brace 300 of FIG. 14 embedded in an endless track 3 to protect a drive bead 10. The exterior faces 321 and 331 of the extending flanges 320 and 330 protect the friction faces 10a and 10c of the drive bead 10 from the roller wheels 5 when the endless track 3 moves in a direction parallel to the axes the roller wheels 5. Additionally, the drive rollers 6 frictionally engage the drive face 10b or 10d of each drive bead 10, depending on the rotation direction of the drive rollers 6. However, assuming wearing away of one of the drive faces 10b and 10d, edges 323 and 333 of the extending flanges 320 and 330 may come into contact with the drive rollers 6 in a manner substantially similar to the reinforcing braces 100 and 200 of the first and second embodiments discussed above.

Figure 16:
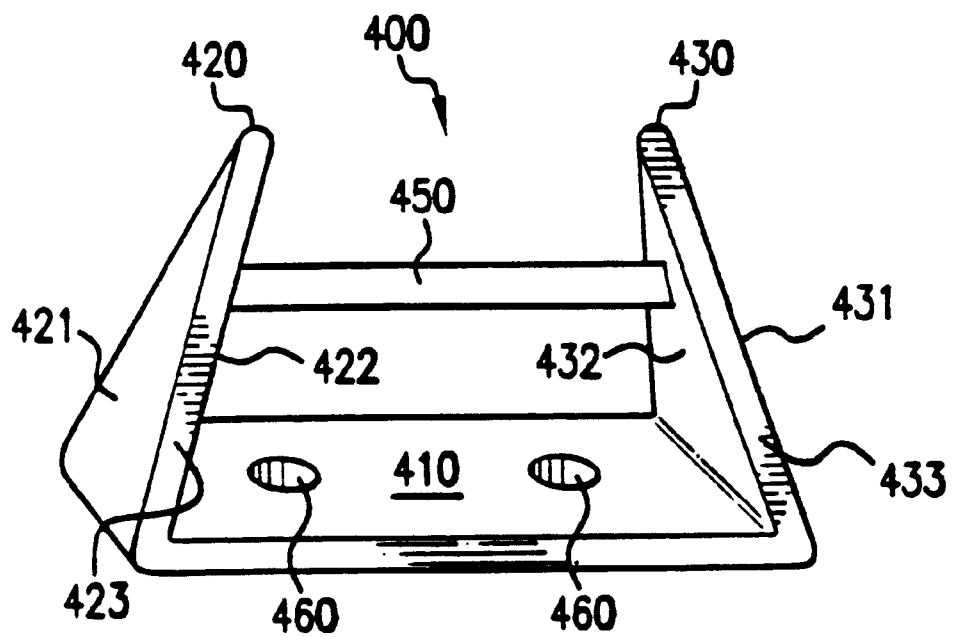
FIG. 16 is a perspective view of a reinforcing brace for protecting a drive bead of the endless track, according to a fifth embodiment of the invention.

FIG. 16 is a perspective view of a reinforcing brace 400 for protecting a drive bead 10 of the endless track 3, according to a fifth embodiment of the invention. The reinforcing brace 400 is substantially similar to the reinforcing brace 300 depicted in FIGS. 12–13, but includes a support rod 450. The support rod 450 is substantially similar to the rod 250 depicted in FIGS. 12–13 and is attached to the interior faces 422 and 432 of extending flanges 420 and 430 in a similar manner.

Figure 17:
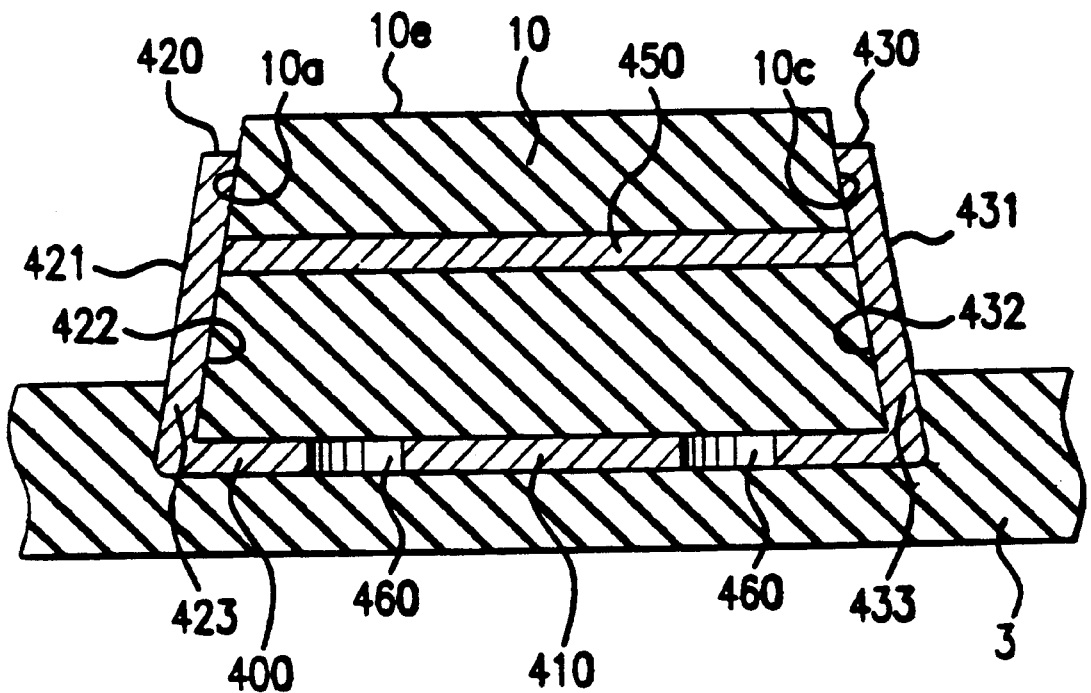
FIG. 17 is a cross-section view of the reinforcing brace of FIG. 16 embedded in the endless track to protect a drive bead.

FIG. 17 is a cross-section view of the reinforcing brace 400 of FIG. 16 embedded in an endless track 3 to protect a drive bead 10. Exterior faces 421 and 431 of the extending flanges 420 and 430 serve to protect the friction faces 10a and 10c of the drive bead 10 from the roller wheels 5 when the endless track 3 moves in a direction parallel to the axes of the roller wheels 5. The support rod 450 maintains a distance and prevents separation between the flanges 420 and 430. Furthermore, the drive rollers 6 frictionally engage the drive faces 10b or 10d of each drive bead 10, depending on the rotation direction of the drive rollers 6. However, assuming wearing away of the drive faces 10b or 10d, edges 423 and 433 of the extending flanges 420 and 430 may come into contact with the drive rollers 6 in a manner substantially similar to the reinforcing braces 100, 200 and 300 as discussed above.

Also, if a top portion 10e of the protected drive bead 10 does wear away, the drive rollers 6 of the planetary drive system 4 will still be able to drive the drive beads 10 of the endless track 3 by engaging the support rod 450, in addition to the edges 423 and 433 of the extending flanges 420 and 430, thereby preventing the planetary drive system 4 from "slipping" while attempting to drive the endless track 3.

FIG. 18 is a perspective view of a unitary reinforcing brace 500 capable of simultaneously protecting at least two drive beads 10, 10, according to a sixth embodiment of the invention. The unitary reinforcing brace 500 is made from a wear-resistant material and may have a uniform thickness t. The unitary reinforcing brace 500 includes a solid connecting section 510 having two ends. At least one pair of flanges 520 and 530 extend from the connecting section 510 at a position corresponding to the location of the drive beads 10,10. The flanges 520 and 530 may be attached to the horizontal section by, for example, welding, thereby improving the structural integrity of the endless track as well as the rigidity of the reinforcing brace 500.

Each flange 520 and 530 extends away from the connecting section 510. The number of pair of flanges can equal the number of drive beads. Additionally, the width and contour of the flanges 520 and 530 are substantially similar to, but slightly smaller than, the width and contour of the friction faces 10a and 10c of the drive bead 10 in a manner similar to the embodiment shown in FIG. 8.

FIG. 19 is a cross-sectional view of the unitary reinforcing brace 500 of FIG. 18 embedded in an endless track 3 to simultaneously protect at least two drive beads 10,10. Exterior faces 521 and 531 of the extending flanges 520 and 530 serve to protect the friction faces 10a and 10c of the drive bead 10 from the roller wheels 5 when the endless track 3 moves in a direction parallel to the axes of the roller wheels 5. Although the flanges 520 and 530 of the unitary reinforcing brace 500 are depicted as being flush with the friction faces 10a and 10c of the drive beads 10,10, the flanges 520 and 530 can be formed to provide a predetermined gap (not shown) between the flanges 520 and 530 and the friction faces 10a and 10c. Additionally, each flange 520 and 530 has a vertical height slightly smaller than the vertical height of the drive beads 10,10.

The drive rollers 6 frictionally engage the drive face 10b or 10d of each drive bead 10,10, depending on the rotation direction of the drive rollers 6. However, assuming wearing away of the drive faces 10b or 10d, edges 523 and 533 of the extending flanges 520 and 530 may come into contact with the drive rollers 6. Because the extending flanges 520 and 530 are made of a wear-resistant material, the flanges 520 and 530 will not wear away from the frictional contact with the drive rollers 6. As such, the drive faces 10b and 10d will not erode as quickly as the unprotected drive beads in the conventional endless track. Thus, even if the drive faces 10b and 10d of the protected drive beads 10,10 do wear away with the frictional contact of the drive rollers 6, the drive rollers 6 of the planetary drive system 4 will drive the drive beads 10 of the endless track 3 by engaging the edges 523 and 533 of the extending flanges 520 and 530, thereby preventing the planetary drive system 4 from "slipping" while attempting to drive the endless track 3.

Additionally, FIG. 19 shows the unitary reinforcing brace having a rib 580 protruding from the connecting section 510 in a direction toward the exterior surface 9 of the drive section 7. The rib 580 is located at a position spanning at least the region of the connecting section 510 between adjacent drive beads 10,10. The rib 580 provides the unitary reinforcing brace 500 with additional strength, for example, when the tracked vehicle 1 is driven over an impediment, such as, for example, a rock or the like.

Figure 20:
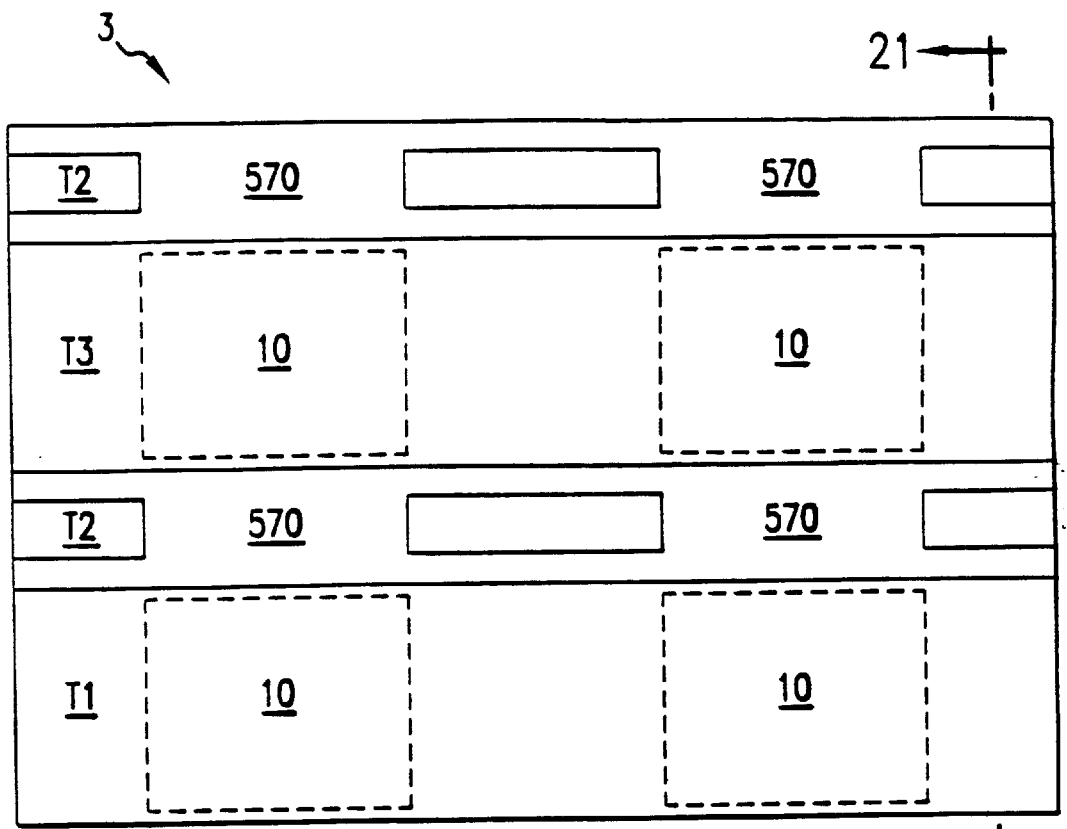
FIG. 20 is a perspective view of the exterior surface of the drive section.
Figure 21:
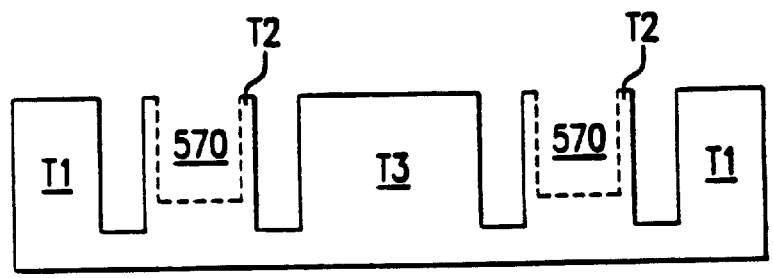
FIG. 21 is a side elevational view along section 21—21 of FIG. 20 with a relieved section of the tread depicted with hidden lines.

Furthermore, a section 570 of the exterior surface 9 of the drive section 7 may be a relief or cutout from the tread T2 between the treads T1 and T3 having the drive beads 10 formed on a reverse surface thereof, as shown in FIG. 20. The cutout section 570 of the exterior surface 9 not only reduces the amount of material needed to form the track 3, but also provides the endless track 3 with additional space to channel any materials, such as rain, ground, dirt and the like through tread T2 in the exterior surface 9 of the track 3 to provide better traction. The dash-lined boxes represent the drive beads 10, which extend from the interior surface (not shown) of the endless track. The side-elevational view of FIG. 21 shows the additional channeling provided by the cutout section 570 in the tread T2. This feature can be used with any of the embodiments described in this application.

FIG. 22 is a perspective view of a unitary reinforcing brace 600 for protecting at least two drive beads 10,10 of the endless track 3, according to a seventh embodiment of the invention. The unitary reinforcing brace 600 is substantially similar to the brace 500 depicted in FIGS. 18–19, but includes a support rod 650 for each pair of extending flanges 620 and 630. Preferably, the support rod 650 is a uniform piece of a wear-resistant material having a first end and a second end where the first end of the support rod 650 is attached, for example, by welding, to an interior face 622 of one extending flange 620 of each pair of flanges and the second end is attached to the interior face 632 of the other extending flange 630 in a similar manner. The support rod 650 maintains a distance and prevents separation between the flanges 620 and 630.

FIG. 23 is a cross-sectional view of the unitary reinforcing brace 600 of FIG. 22 embedded in an endless track 3 to protect at least two drive beads 10,10. The exterior faces 621 and 631 of the extending flanges 620 and 630 serve to protect the friction faces 10a and 10c of the drive beads 10,10 from the roller wheels 5 when the endless track 3 moves in a direction parallel to the axes of the roller wheels 5. Furthermore, the drive rollers 6 frictionally engage the drive faces 10b or 10d of each drive bead 10,10 depending on the rotation direction of the drive rollers 6. However, assuming wearing away of the drive faces 10b or 10d, edges 623 and 633 of the extending flanges 620 and 630 may come into contact with the drive rollers 6 in a manner substantially similar to the unitary reinforcing brace 500 of the fifth embodiment as discussed above. Additionally, if the top portion 10e of the protected drive beads 10,10 does wear away, the drive rollers 6 of the planetary drive system 4 will drive the drive beads 10,10 of the endless track 3 by engaging the edges 623 and 633 of the extending flanges 620 and 630, thereby preventing the planetary drive system 4 from "slipping" while attempting to drive the endless track 3.

FIG. 24 is a perspective view of a unitary reinforcing brace 700 for protecting at least two drive beads 10,10 of the endless track 3, according to an eighth embodiment of the invention. The unitary reinforcing brace 700 is substantially similar to the brace 600 depicted in FIGS. 18–19, but includes at least one aperture 760 in a connecting section 710 between each pair of extending flanges 720 and 730. The apertures 760 are configured to interact with a portion of the endless track 3 and promote locking of the reinforcing brace 700 embedded in the endless track 3.

FIG. 25 is a cross-sectional view of the unitary reinforcing brace 700 of FIG. 24 embedded in an endless track 3 to protect the at least two drive beads 10,10. Exterior faces 721 and 731 of each extending flange 720 and 730 protects the friction faces 10a and 10c of each drive bead 10 from the roller wheels 5 when the endless track 3 moves in a direction parallel to the axes of the roller wheels 5. Additionally, the drive rollers 6 frictionally engage the drive face 10b or 10d of each drive bead 10 depending on the rotation direction of the drive rollers 6. However, assuming wearing away of the drive faces 10b or 10d, edges 723 and 733 of the extending flanges 720 and 730 may come into contact with the drive rollers 6 in a manner substantially similar to the unitary reinforcing braces 500 and 600 discussed above.

Figure 26:
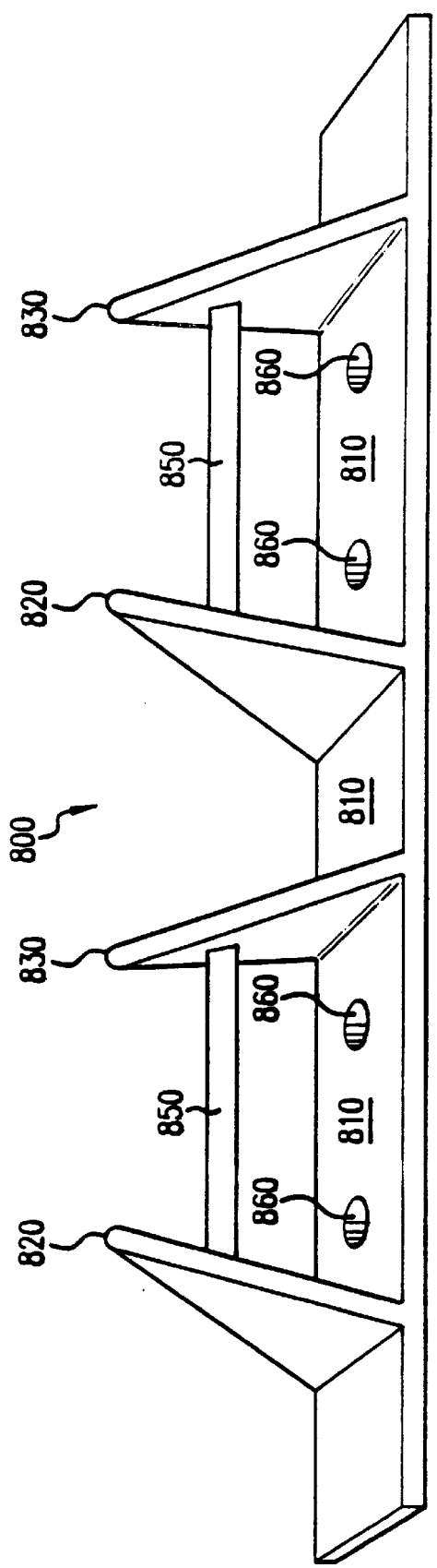
FIG. 26 is a perspective view of an unitary reinforcing brace for protecting at least two drive beads of the endless track, according to a ninth embodiment of the invention.

FIG. 26 is a perspective view of a unitary reinforcing brace 800 for protecting at least two drive beads 10,10 of the endless track 3, according to a ninth embodiment of the invention. The unitary reinforcing brace 800 is substantially similar to the brace 700 depicted in FIGS. 22–23, but includes a support rod 850 between each pair of extending flanges 820 and 830. The support rod 850 is substantially similar to the rod 650 depicted in FIGS. 20–21 and is attached to interior faces 822 and 832 of the extending flanges 820 and 830 in a similar manner, e.g., by welding. The support rod 850 maintains a distance and prevents separation between the flanges 820 and 830.

Figure 27:
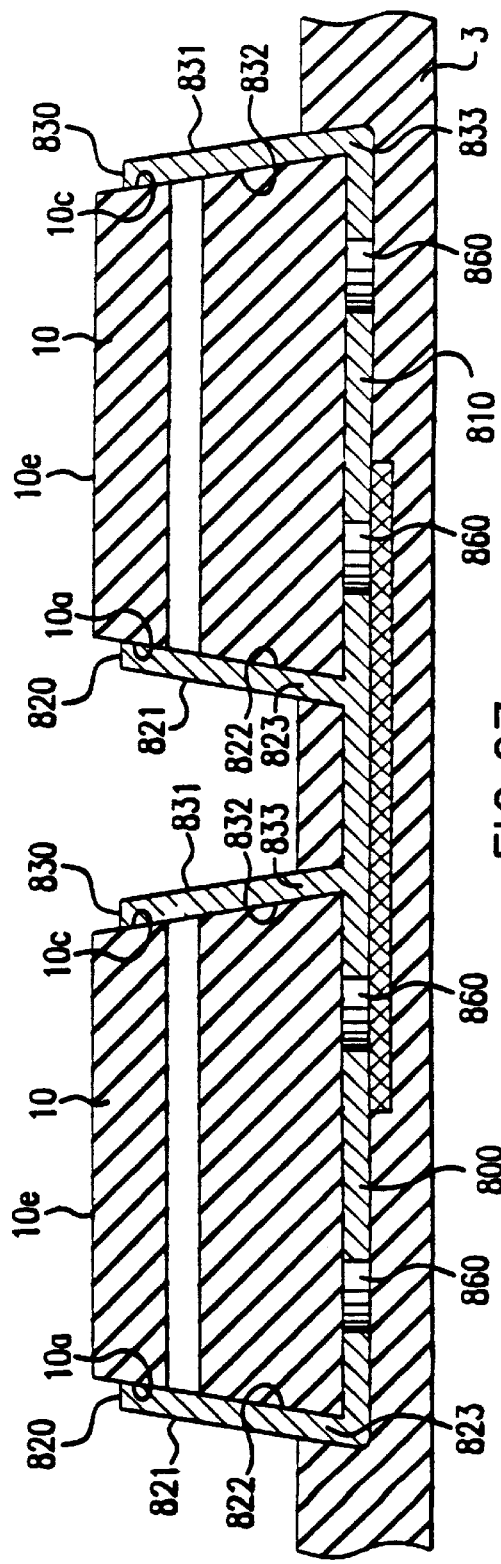
FIG. 27 is a cross-sectional view of the unitary reinforcing brace of FIG. 26 embedded in an endless track to protect the drive beads.

FIG. 27 is a cross-sectional view of the unitary reinforcing brace 800 of FIG. 26 embedded in an endless track 3 to protect the drive beads 10,10. The exterior faces 821 and 831 of the extending flanges 820 and 830 serve to protect the friction faces 10a and 10c of the drive beads 10,10 from the roller wheels 5 when the endless track 3 moves in a direction parallel to the axes of the roller wheels 5. Furthermore, the drive rollers 6 frictionally engage the drive faces 10*b* or 10*d* of each drive bead 10,10 depending on the rotation direction of the drive rollers 6. However, assuming wearing away of the drive faces 10*b* or 10*d*, edges 823 and 833 of the extending flanges 820 and 830 may come into contact with the drive rollers 6 in a manner substantially similar to the unitary reinforcing brace 600 of the seventh embodiment as discussed above. Also, if the top portion 10*e* of the protected drive beads 10,10 does wear away, the drive rollers 6 of the planetary drive system 4 will drive the drive beads 10,10 of the endless track 3 by engaging the edges 823 and 833 of the extending flanges 820 and 830, thereby preventing the planetary drive system 4 from "slipping" while attempting to drive the endless track 3.

Figure 27A:
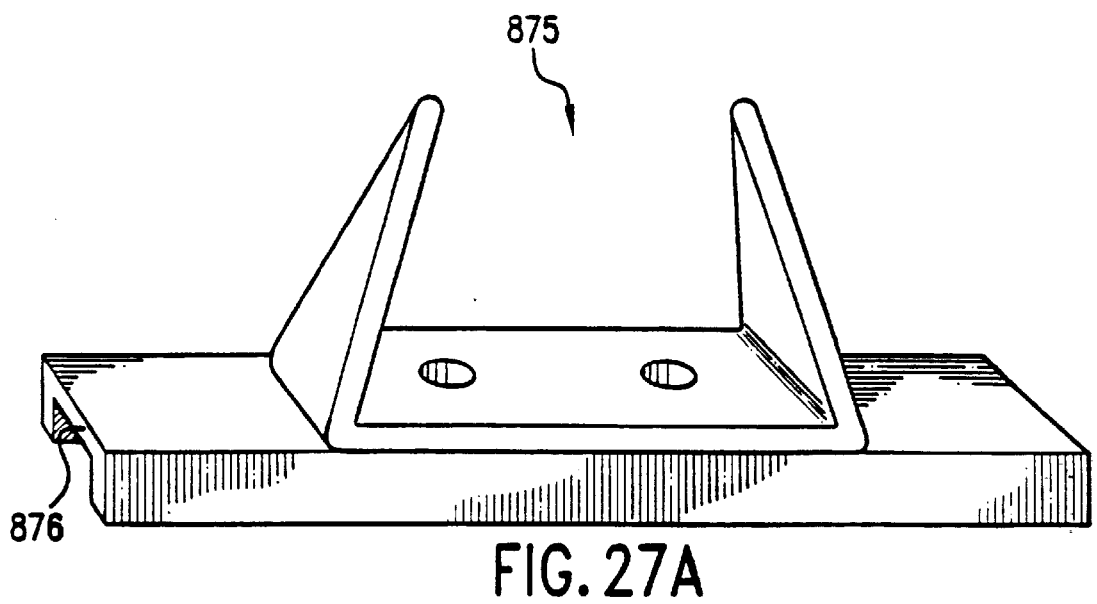
FIG. 27A is a perspective view of a removable steel tread.
Figure 27B:
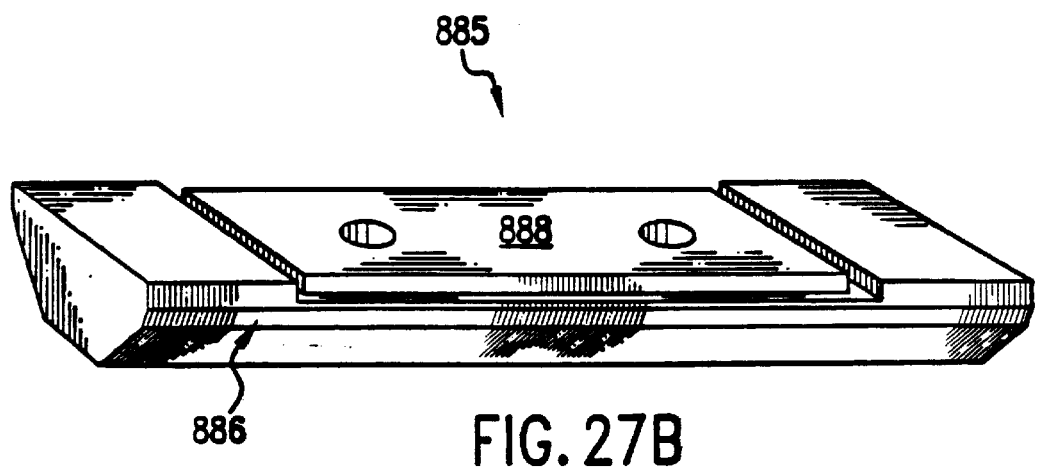
FIG. 27B is a perspective view of a removable polymeric tread.

Furthermore, as discussed above, the apertures 360, 460, 760 and 860 in the reinforcing braces 300, 400, 700 and 800, respectively, are configured to interact with a portion of the endless track 3 and promote locking of the braces 300, 400, 700 and 800 embedded in the track 3. However, each of the apertures 360, 460, 760 and 860 may be used with a drive section 7 that preferably includes removable tread elements 875 or 885 having suitable bolts or other fastening means that can be received in the apertures 360, 460, 760 and 860 of the connecting section 310, 410, 710 and 810, respectively. For example, the treads T1, T2 and T3 can be removable, such as steel treads 875 in FIG. 27A and polymeric treads 885 in FIG. 27B. The polymeric treads 885 may have a tapered cross-section 886, while the steel treads 875 may have a U-shaped contour or channel 876. The polymeric tread 885 may include a metal or reinforcing plate 888 for attachment with the reinforcing brace. Removable tread elements are disclosed, for example, in U.S. Pat. No. 5,005,921 to Edwards et al. entitled "Endless Track Drive System," e.g., see FIG. 7, which is incorporated herein in its entirety.

The reinforcing brace according to the invention is used to protect at least one drive bead of the endless track by embedding the reinforcing brace in the endless track a predetermined depth such that each flange extends away from the connecting section and exterior surface of the endless track toward the endless drive system. To embed the reinforcing brace in the endless track, the preformed reinforcing brace is immersed in, e.g., a molten polymeric solution in a mold from which the endless track is formed. The reinforcing brace is positioned within the mold at a location in which a drive bead is formed such that each reinforcing brace encompasses a drive bead.

The polymeric solution with the reinforcing brace is then permitted to cool. Once the polymeric solution has cooled and solidified, the endless track with the reinforcing brace embedded therein is then removed from the mold. The endless track is then placed on a vehicle intended to travel across the ground.

Figure 28:
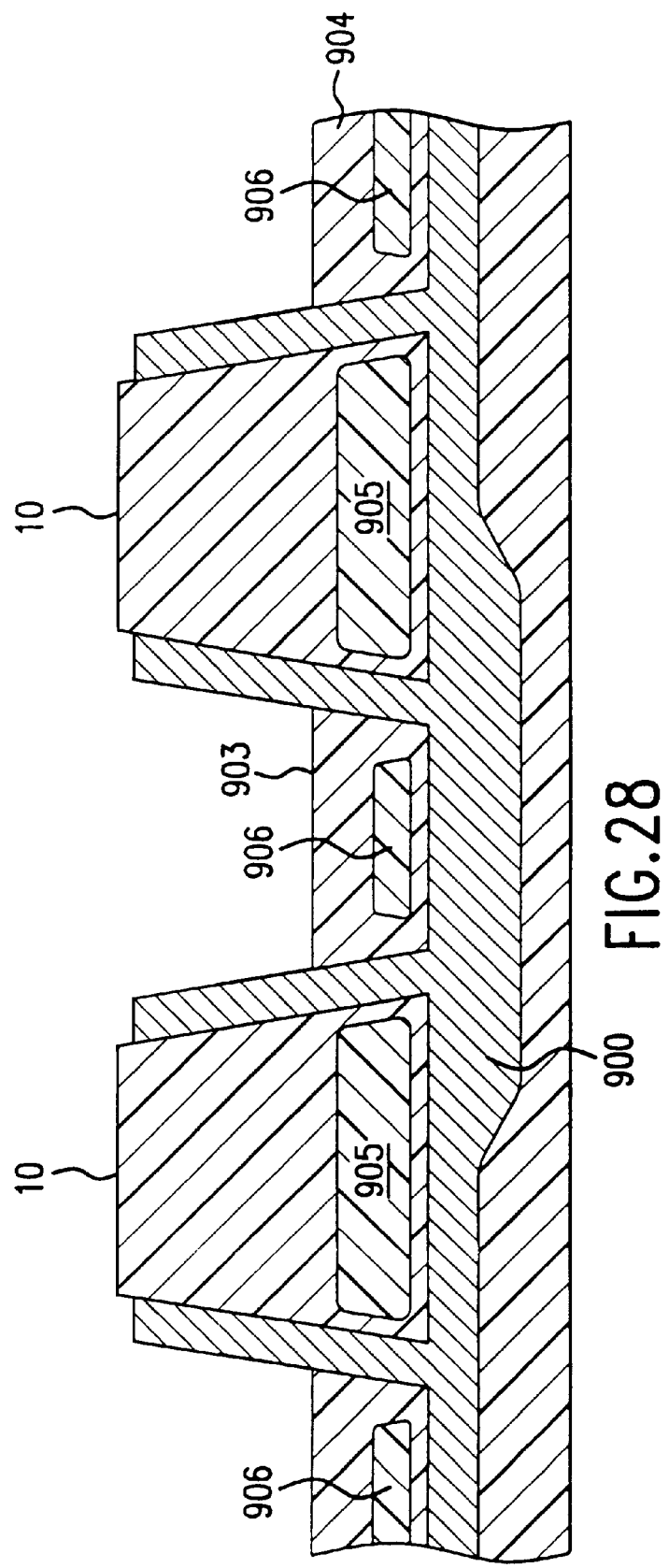
FIG. 28 is a cross-sectional view of a unitary reinforcing brace embedded in an endless track with reinforcing belts, according to a tenth embodiment of the invention.

FIG. 28 shows a cross-sectional view of a unitary brace 900 embedded in a reinforced endless track 903 according to a tenth embodiment of the invention. The endless track 903 is reinforced with belts 905,906 extending within the track 903 in the longitudinal direction of the track 903. The belts can be made from a polymeric material different than the polymeric material from which the track body 904 is made. Furthermore, the belts 905 positioned within the drive beads 10 can be larger than the belts 906 between and outside the drive beads 10 in the longitudinal direction of the endless track 3.

Figure 29:
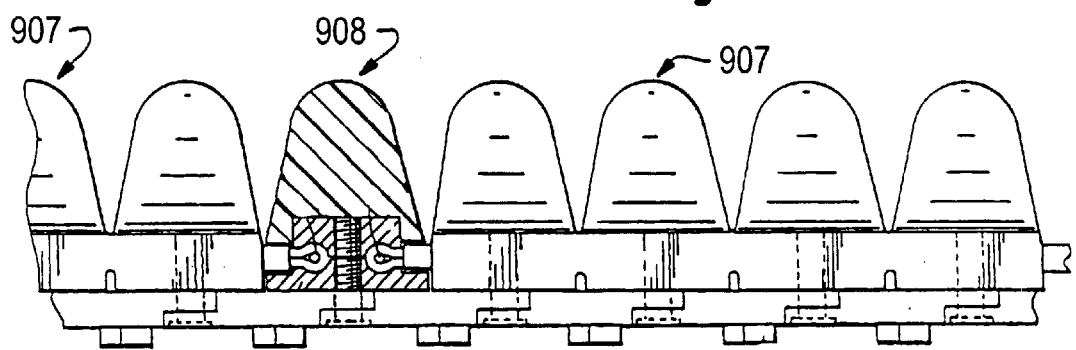
FIG. 29 is a perspective view of a master link joint assembly used to interconnect one or more sections of endless track.

Additionally, although preferred embodiments of the invention as set forth herein describe an endless track as a closed-loop integral assembly, the endless track 3 can be one or more sections 907 interconnected by one or more master link joint assemblies, such as disclosed in U.S. Pat. Nos. 4,844,560 entitled "Endless Drive Track Joint Assembly"; 5,020,865 also entitled "Endless Drive Track Joint Assembly"; and 5,040,282 entitled "Method of Making A Modular Endless Track Drive System", all issued to Edwards et al. and all incorporated herein by reference in their entireties. For example, the reinforcing belts 905 and 906 of FIG. 28 can be arranged for this purpose around a grooved rod sandwiched between connected portions of a master link joint assembly 908 as shown in FIG. 29.

While the invention has been described in conjunction with the specific embodiments thereof, it is evident that many alternatives, modifications and variations may be apparent to those skilled in the art. Accordingly, preferred embodiments of the invention as set forth herein are intended to be illustrative, not limiting. Various changes may be made without departing from the spirit and scope of the invention.

What is claimed is:

1. An endless drive track system for use with a tracked vehicle, comprising:

a drive system;

an endless track having a plurality of drive beads, each drive bead including at least one drive face and first and second friction faces, the at least one drive face cooperating with the drive system; and a reinforcing brace including a first flange adjacent the first friction face of at least one of the drive beads, a second flange adjacent the second friction face of the at least one of the drive beads, and a section connecting the first and second flanges in a lateral direction, the connecting section being embedded in one of the endless track and the at least one of the drive beads, the first and second flanges extending from the connecting section substantially transversely to the lateral direction.

2. The endless drive track system according to claim 1, wherein the connecting section comprises a support rod attached to an interior face of the first flange and an interior face of the second flange, the support rod maintaining a distance between the interior faces of the first and second flanges.

3. The endless drive track system according to claim 1, wherein the connecting section comprises a plate having two ends, one end of the plate being attached to the first flange adjacent an end of the first flange, the other end of the plate being attached to the second flange adjacent a corresponding end of the second flange.

4. The endless drive track system according to claim 3, wherein the reinforcing brace further comprises:

a support rod attached to an interior face of the first flange and an interior face of the second flange and extending substantially parallel to the connecting section and maintaining a distance between the interior faces of the first and second flanges.

5. The endless drive track system according to claim 4, wherein the connecting section spans across at least two drive beads and the reinforcing brace includes first and second sets of the first and second flanges.

6. The endless drive track system according to claim 5, wherein the connecting section further comprises a rib extending away from the plate in a direction opposite to the first and second flanges.

7. The endless drive track system according to claim 5, wherein the endless track includes an exterior surface having a portion of a tread with a cutout.

8. An endless drive track system for use with a tracked vehicle, comprising:
   a drive system;
   an endless track having a plurality of drive beads, each drive bead including at least one drive face and first and second friction faces, the at least one drive face cooperating with the drive system; and
   a reinforcing brace including a first flange adjacent the first friction face of at least one of the drive beads, a second flange adjacent the second friction face of the at least one of the drive beads, and a connecting section connecting the first and second flanges, wherein the connecting section spans across at least two drive beads and the reinforcing brace includes first and second sets of the first and second flanges.

9. The endless drive track system according to claim 8, wherein the connecting section further comprises a rib extending away from the plate in a direction opposite to the first and second flanges.

10. The endless drive track system according to claim 8, wherein the endless track includes an exterior surface having a portion of a tread with a cutout.

11. The endless drive track system according to claim 2, wherein the connecting section further comprises a plate spanning across at least two drive beads, the reinforcing brace including first and second sets of the first and second flanges.

12. The endless drive track system according to claim 11, wherein the connecting section further comprises a rib extending away from the plate in a direction opposite to the first and second flanges.

13. The endless drive track system according to claim 11, wherein the endless track includes an exterior surface having a portion of a tread with a cutout.

14. An endless drive track system for use with a tracked vehicle, comprising:
   a drive system;
   an endless track having a plurality of drive beads, each drive bead including at least one drive face and first and second friction faces, the at least one drive face cooperating with the drive system;
   a reinforcing brace including a first flange adjacent the first friction face of at least one of the drive beads and a second flange adjacent the second friction face of the at least one of the drive beads; and
   a connecting section spanning across at least two drive beads and including first and second sets of the first and second flanges.

15. The endless drive track system according to claim 14, wherein the connecting section further comprises a rib extending away from the connecting section in a direction opposite to the first and second flanges.

16. The endless drive track system according to claim 1, wherein the endless track includes an exterior surface having a portion of a tread with a cutout.

17. The endless drive track system according to claim 1, wherein the first flange extends from a first end of the connecting section and the second flange extends from a second end of the connecting section.

18. The endless drive track system according to claim 17, wherein the reinforcing brace further comprises a support rod attached to an interior face of the first flange and an interior face of the second flange, the support rod extending substantially parallel to the connecting section and maintaining a distance between the interior faces of the first and second flanges.

19. The endless drive track system according to claim 17, wherein the connecting section of the reinforcing brace further includes at least one aperture configured to interact with a portion of one of the endless track and the at least one of the drive beads.

20. The endless drive track system according to claim 17, wherein the reinforcing brace further comprises:
   a support rod attached to an interior face of the first flange and an interior face of the second flange and extending substantially parallel to the connecting section and maintaining a distance between the interior faces of the first and second flanges; and
   at least one aperture in the connecting section, the at least one aperture being configured to interact with a portion of one of the endless track and the at least one of the drive beads.

21. The endless drive track system according to claim 1, wherein the endless track is reinforced with a plurality of belts extending within the endless track in a longitudinal direction of the endless track.

22. An endless track comprising:
   an interior surface having at least one drive bead, the at least one drive bead including first and second friction faces;
   an exterior surface facing a direction opposite to the interior surface; and
   a reinforcing brace made of wear-resistant material and comprising a first flange, a second flange, and a section connecting the first and second flanges in a lateral direction, the connecting section being embedded in one of the endless track, between the interior and exterior surfaces, and the at least one drive bead, the first flange being adjacent the first friction face and the second flange being adjacent the second friction face the first and second flanges extending from the connecting section substantially transversely to the lateral direction.

23. The endless track according to claim 22, wherein the connecting section comprises a support rod attached to an interior face of the first flange and an interior face of the second flange, the support rod maintaining a distance between the interior faces of the first and second flanges.

24. The endless drive track system according to claim 22, wherein the connecting section comprises a plate having two ends, one end of the plate being attached to the first flange adjacent an end of the first flange, the other end of the plate being attached to the second flange adjacent a corresponding end of the second flange.

25. The endless drive track system according to claim 22, wherein the reinforcing brace further comprises:
   a support rod attached to an interior face of the first flange and an interior face of the second flange and maintaining a distance between the interior faces of the first and second flanges.

26. The endless drive track system according to claim 25, wherein the connecting section spans across at least two drive beads and the reinforcing brace includes first and second sets of the first and second flanges.

27. The endless drive track system according to claim 26, wherein the connecting section further comprises a rib extending away from the connecting section in a direction opposite to the first and second flanges.

28. The endless drive track system according to claim 26, wherein the endless track includes an exterior surface defining a tread, a portion of which includes a cutout.

29. The endless drive track system according to claim 22, wherein the first flange extends from a first end of a connecting section and the second flange extends from a second end of the connecting section.

30. The endless drive track system according to claim 29, wherein the reinforcing brace further comprises a support rod attached to an interior face of the first flange and an interior face of the second flange, the support rod extending substantially parallel to the connecting section and maintaining a distance between the interior faces of the first and second flanges.

31. The endless drive track system according to claim 29, wherein the connecting section of the reinforcing brace further includes at least one aperture configured to interact with a portion of the endless track.

32. The endless drive track system according to claim 29, wherein the reinforcing brace further comprises:
- a support rod attached to an interior face of the first flange and an interior face of the second flange and extending substantially parallel to the connecting section and maintaining a distance between the interior faces of the first and second flanges; and
- at least one aperture in the connecting section, the at least one aperture being configured to interact with a portion of one of the endless track and the at least one of the drive beads.

33. The endless track according to claim 22, wherein the endless track is reinforced with a plurality of belts extending within the endless track in a longitudinal direction of the endless track.

34. The endless track according to claim 22, further comprising a cap attached to a top portion of the first and second flanges, the cap shielding a top portion of the drive bead.

35. The endless track according to claim 22, comprising at least one section interconnected by at least one master link joint assembly.

36. A method for forming an endless drive track having a plurality of drive beads, each drive bead having first and second friction faces, the endless drive track including an interior surface from which each drive bead of the plurality of drive beads extends and an exterior surface facing a direction opposite to the interior surface, the method comprising:
- forming an endless track; and
- embedding a connecting section of a reinforcement brace within one of the endless track, between the interior and exterior surfaces, and at least one of the drive beads, the connecting section connecting a first flange to a second flange, the first and second flanges of the reinforcing brace extending inwardly from the interior surface to substantially cover the first and second friction faces of the at least one of the drive beads.

37. The endless drive track system according to claim 1, wherein the connecting section includes at least one aperture that is configured to interact with a portion of one of the endless track and the at least one of the drive beads.

* * * * *